United States Patent
Qiu et al.

(10) Patent No.: US 10,894,881 B2
(45) Date of Patent: Jan. 19, 2021

(54) PRODUCT, COMPOSITION AND APPLICATION THEREOF, AND AUTOMOBILE TIRE INNER LINER, TUBE AND CURING BLADDER

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yingxin Qiu, Beijing (CN); Huiqin Gong, Beijing (CN); Lei Zhang, Beijing (CN); Weijuan Meng, Beijing (CN); Xinqin Zhou, Beijing (CN); Lei Wang, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 39 days.

(21) Appl. No.: 16/331,470

(22) PCT Filed: Sep. 7, 2017

(86) PCT No.: PCT/CN2017/100940
§ 371 (c)(1),
(2) Date: Mar. 7, 2019

(87) PCT Pub. No.: WO2018/045987
PCT Pub. Date: Mar. 15, 2018

(65) Prior Publication Data
US 2019/0218384 A1    Jul. 18, 2019

(30) Foreign Application Priority Data

Sep. 7, 2016 (CN) .......................... 2016 1 0806653
Sep. 7, 2016 (CN) .......................... 2016 1 0806751

(51) Int. Cl.
| | | |
|---|---|---|
| C08F 210/12 | (2006.01) | |
| C08L 51/00 | (2006.01) | |
| C08F 236/10 | (2006.01) | |
| C08F 255/10 | (2006.01) | |
| C08L 51/04 | (2006.01) | |
| C08L 23/22 | (2006.01) | |
| C08F 8/22 | (2006.01) | |
| B60C 1/00 | (2006.01) | |
| C08K 3/04 | (2006.01) | |
| C08K 5/00 | (2006.01) | |

(52) U.S. Cl.
CPC ............ *C08L 23/22* (2013.01); *B60C 1/0008* (2013.01); *C08F 8/22* (2013.01); *C08F 210/12* (2013.01); *C08F 236/10* (2013.01); *C08F 255/10* (2013.01); *C08K 3/04* (2013.01); *C08K 5/0025* (2013.01); *C08L 51/00* (2013.01); *C08L 51/04* (2013.01)

(58) Field of Classification Search
CPC ................................ C08L 23/22; C08L 51/04
See application file for complete search history.

(56) References Cited

U.S. PATENT DOCUMENTS

| | | |
|---|---|---|
| 3,780,002 A | 12/1973 | Kresge et al. |
| 4,474,924 A | 10/1984 | Powers et al. |
| 5,071,913 A | 12/1991 | Powers et al. |
| 5,194,538 A | 3/1993 | Puskas et al. |
| 7,241,831 B2 | 7/2007 | Waddell et al. |
| 7,329,697 B2 | 2/2008 | Waddell et al. |
| 9,127,137 B2 | 9/2015 | Leiberich et al. |
| 9,850,331 B2 | 12/2017 | Teertstra et al. |
| 2003/0166809 A1 | 9/2003 | Gronowski |
| 2004/0242731 A1 | 12/2004 | Waddell et al. |
| 2007/0179251 A1 | 8/2007 | Waddell et al. |
| 2017/0051090 A1* | 2/2017 | Teertstra ................... C08F 6/10 |

FOREIGN PATENT DOCUMENTS

| | | |
|---|---|---|
| CN | 1036022 A | 10/1989 |
| CN | 1966537 A | 5/2007 |
| CN | 101353403 A | 1/2009 |
| CN | 103724571 A | 4/2014 |
| RU | 2079522 C1 | 5/1997 |

* cited by examiner

*Primary Examiner* — Jeffrey C Mullis

(74) *Attorney, Agent, or Firm* — Novick, Kim & Lee, PLLC; Allen Xue

(57) ABSTRACT

Butyl rubber, a preparation method therefor, and an application thereof, and a composition and rubber product containing the butyl rubber. The butyl rubber comprises a structural unit derived from isobutylene, a structural unit derived from conjugated diene, and a structural unit selectively derived from aryl olefin represented by formula I, at least a part of the conjugated diene being isoprene. Also provided are an automobile tire inner liner, tube and curing bladder made of the butyl rubber. The butyl rubber has good processability and compounding properties, die swell ratio and integrated mechanical properties, and particularly high tear strength. The butyl rubber can effectively reduce power consumption in the processing and compounding process, and the prepared product has good dimensional stability and application performance.

23 Claims, 3 Drawing Sheets

PRODUCT, COMPOSITION AND APPLICATION THEREOF, AND AUTOMOBILE TIRE INNER LINER, TUBE AND CURING BLADDER

TECHNICAL FIELD

The present invention relates to a butyl rubber, preparation method and application therefore, and a halogenated butyl rubber and application therefore, and also relates to a composition and a rubber product based on the butyl rubber and/or halogenated butyl rubber. The present invention further relates to an automobile tire inner liner, a tire inner tube and a curing bladder formed by the butyl rubber and/or halogenated butyl rubber.

BACKGROUND

Butyl rubber has been around for more than 60 years since its inception as a commodity. Due to its excellent air tightness, damping properties, heat aging resistance, ozone resistance and weather resistance, etc, the butyl rubber has become one of the most important synthetic rubber varieties. Due to the different process conditions used by various manufacturers to produce the butyl rubber, the quality of commercial butyl rubber products varies, especially for processing and application properties, and product differences between different manufacturers are obvious.

For a long time, researchers have always been working to improve the processing and application properties of the butyl rubber. The research result indicates that the processing and application properties of the butyl rubber actually have a very important relationship with molecular weight and molecular weight distribution. When the butyl rubber is produced, except for ensuring a sufficient weight average molecular weight, it is necessary to maintain a proper balance of high and low molecular weight parts, wherein a high molecular weight part is to obtain sufficient green strength, and a low molecular weight part is to guarantee a certain rate of stress relaxation.

The method for improving the processing properties of the butyl rubber is mainly to improve the molecular weight and molecular weight distribution of the butyl rubber.

In U.S. Pat. No. 3,780,002 a metal halide of Group II or Group III of the Periodic Table of the Elements and a tetrahalide of a metal of the Periodic Table of the Elements are used to form a composite initiator, such as a composite of $AlCl_3$ and $TiCl_4$, or a composite of $AlCl_3$ and $SnCl_4$ such that each of the initiators can independently initiate cationic polymerization, and a butyl rubber having a molecular weight distribution index $M_w/M_n$ of 5.0 or above is synthesized under conventional butyl rubber polymerization conditions.

U.S. Pat. No. 5,194,538 discloses composite use of initiators having different number of functional groups, that is, a compound containing 2-4 hydroxyl groups is additionally added to a conventional butyl rubber $H_2O/AlCl_3$ initiation system, and as a result, a butyl polymer exhibiting a bimodal molecular weight distribution is obtained.

In US20030166809, an initiation system is activated and modified by adding a small amount of activator aluminoxane in a mixed system of dialkylaluminum chloride and monoalkylaluminum dichloride, and by changing the amount of aluminoxane, a butyl rubber with different molecular weight distribution can be obtained.

In CN1966537A, some additive agents, for example compounds such as alcohols, phenols, amines or pyridines, amides, carboxylates or ketones or the like are added in a slurry polymerization system with $H_2O/AlCl_3$ as an initiation system, a composite initiator system is formed after an aging reaction with $AlCl_3$, and through adjusting the ratio of the additive agent to $AlCl_3$, the molecular weight and molecular weight distribution of the butyl rubber can be adjusted within a certain range.

Butyl rubber is widely used in the manufacture of an automobile tire inner tube, an inner liner and a curing bladder, and the like. The property requirements for the butyl rubber are also different for different applications. The butyl rubber for an inner tube should have good heat resistance, elasticity and less permanent deformation while having good airtightness. The main function of the inner liner is to prevent gas leakage, so the rubber material of the inner liner needs to have good air tightness and a low gas permeability coefficient. The curing bladder is used to separate a vulcanization medium from the inner surface of the green tire when the automobile outer tire is vulcanized, and to transmit heat and pressure onto the inner surface of the green tire, and the quality of the curing bladder is related to the quality of the outer tire and the production cost of the tire, wherein the main indicator for evaluating the quality of the curing bladder is the service life of the curing bladder, that is, the number of uses of the outer tire quality is safely ensured, and one cycle per vulcanization (i.e. one tire per vulcanization) is counted as used once. At present, there are different brands of butyl rubber for inner tubes, inner liners and curing bladders.

Although some progress has been made in improving the processing properties of the butyl rubber, butyl rubber of the corresponding brand name has been developed for different applications of the butyl rubber, it is still necessary to develop a new type of butyl rubber to obtain more excellent processing properties and more comprehensive application properties.

CONTENTS OF THE INVENTION

It is an object of the present invention to provide a butyl rubber which has improved processing properties, and the corresponding product has superior dimensional stability and more comprehensive application properties.

According to a first aspect of the invention, the present invention provides a butyl rubber, comprising structural unit derived from isobutylene, structural unit derived from conjugated diene, and optionally structural unit derived from aryl olefin, wherein at least a part of the conjugated diene is isoprene, and the aryl olefin is selected from a group consisting of compounds shown in Formula I,

(Formula I)

in Formula I, $R_1$ is an aryl group of $C_6$-$C_{20}$;
in the butyl rubber, a part of the structural unit derived from conjugated diene is used as a grafting site such that a part of the molecular chain of the butyl rubber is grafted chain, and a remaining part of the molecular chain of the butyl rubber is linear chain;
a peak molecular weight of the butyl rubber is 0.9 million to 2.6 million, and content of the butyl rubber of which Log (MW) is greater than or equal to 6 is 30 to 80% by weight.

According to a second aspect of the present invention, the present invention provides a method for preparing a butyl rubber, comprising a step of contacting isobutylene and isoprene with at least one grafting agent in at least one diluent in the presence of at least one Lewis acid and at least one compound capable of providing protons under cationic polymerization conditions, wherein an amount of the grafting agent is 0.01 to 3% by weight of isobutylene,
the Lewis acid is selected from a group consisting of compound shown in a Formula III,

  (Formula III)

in Formula III, $R^5$ present in a total of n are the same or different, and each of $R^5$ is an alkyl group of $C_1$-$C_8$; $X^1$ present in a total of 3-n are the same or different, and each of $X^1$ is one of selected from a group consisting of halogen groups; n is 1, 2 or 3;
the compound capable of providing protons is selected from a group consisting of protonic acids.

According to a third aspect of the invention, the present invention provides a butyl rubber prepared by the method according to the second aspect of the present invention.

According to a fourth aspect of the present invention, the present invention provides a halogenated butyl rubber, comprising a rubber matrix and halogen elements bonded to the rubber matrix, wherein the rubber matrix is the butyl rubber according to the first aspect or the third aspect of the present invention.

According to a fifth aspect of the present invention, the present invention provides a composition, comprising a butyl rubber and/or a halogenated butyl rubber, a vulcanizing agent and optionally at least one additive agent, wherein the additive agent is selected from a group consisting of vulcanization accelerator and carbon black, the butyl rubber is the butyl rubber according to the first aspect or the third aspect of the present invention, and the halogenated butyl rubber is the halogenated butyl rubber according to the fourth aspect of the present invention.

According to a sixth aspect of the present invention, the present invention provides a rubber product, formed by vulcanizing the composition according to the fifth aspect of the invention.

According to a seventh aspect of the present invention, the present invention provides an application of the butyl rubber according to the first aspect or the third aspect of the invention, the halogenated butyl rubber according to the fourth aspect, the composition according to the fifth aspect, or the rubber product according to the sixth aspect in preparation of an automobile tire inner liner, an automobile tire inner tube, and a curing bladder.

According to an eighth aspect of the present invention, the present invention provides an automobile tire inner liner, formed by the halogenated butyl rubber according to the fourth aspect of the invention, the composition according to the fifth aspect the present invention, or the rubber product according to the sixth aspect the present invention.

According to a ninth aspect of the invention, the invention provides an automobile tire inner tube, formed by the butyl rubber according to the first aspect or the third aspect of the present invention, the halogenated butyl rubber according to the fourth aspect of the present invention, the composition according to the fifth aspect of the present invention, or the rubber product according to the sixth aspect of the present invention.

According to a tenth aspect of the present invention, the present invention provides a curing bladder, formed by the butyl rubber according to the first aspect or the third aspect of the present invention, the composition according to the fifth aspect of the present invention, or the rubber product according to the sixth aspect of the present invention.

Compared with the prior butyl rubber, the butyl rubber according to the present invention has the following advantages:

(1) Compared with the commercial butyl rubber, the butyl rubber according to the present invention has better processing and compounding properties, can effectively reduce the power consumption during the processing and compounding process, and makes the filler dispersion more uniform;

(2) The butyl rubber according to the present invention has a lower shearing viscosity and a lower extrusion swell ratio, can obtain better processing fluidity and higher dimensional stability of the product, and is more suitable for an injection molding process, and the prepared product has more excellent dimensional stability;

(3) The butyl rubber according to the present invention has better comprehensive mechanical properties, particularly higher tear strength; and (4) The butyl rubber according to the present invention has good airtightness.

The butyl rubber according to the present invention has comprehensive application properties and is suitable for producing an automobile tire inner liner, an automobile tire inner tube, and a curing bladder, and is particularly suitable for producing the curing bladder.

BRIEF DESCRIPTION OF THE DRAWINGS

The drawings are intended to provide a further understanding of the invention and constitute a part of the description for explaining the invention in conjunction with the following detailed Examples, but do not constitute a limitation to the invention.

DETAILED DESCRIPTION OF THE EMBODIMENTS

Figure 1:
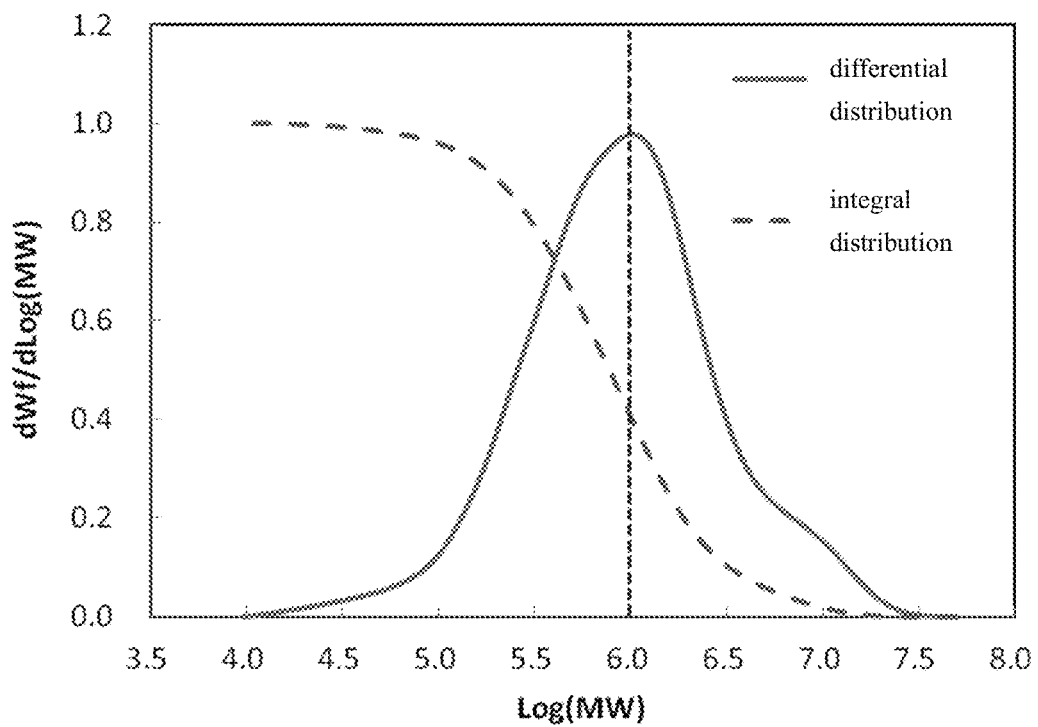
FIG. 1 is a gel permeation chromatogram of the butyl rubber prepared in Example 2.

Specific embodiments of the present invention will be described in detail below. It should be understood that the specific embodiments described herein are merely for illustrating and interpreting the present invention and are not intended to limit the present invention.

The endpoints and any values of the ranges disclosed herein are not limited to the precise range or value, and such ranges or values should be understood to include values that are close to the ranges or values. For numerical ranges, the endpoint values of the various ranges can be combined to obtain one or more new numerical ranges, the endpoint values of the various ranges can be combined with the individual point values to obtain one or more new numerical ranges, and the individual point values can be combined to obtain one or more new numerical ranges, and the new numerical ranges should be considered as specifically disclosed herein. In the present invention, the term of "at least one" means one or two or more. In the present invention, the term of "optional" means "with or without", "including or not including".

According to a first aspect of the present invention, the present invention provides a butyl rubber, comprising structural unit derived from isobutylene, structural unit derived from conjugated diene, and optionally structural unit derived from aryl olefin, wherein at least a part of the conjugated diene is isoprene.

In the present invention, the term of "structural unit derived from isobutylene" means that the structural unit is formed by isobutylene, and compared with isobutylene, the structural unit has the same atomic species and the number of atoms except for the change in the electronic structure; the term of "structural unit derived from conjugated diene" means that the structural unit is formed by conjugated diene, and compared with the conjugated diene, the structural unit has the same atomic species and the number of atoms except for the change in the electronic structure; the term of "structural unit derived from aryl olefin" means that the structural unit is formed by aryl olefin, and compared with the aryl olefin, the structural unit has the same atomic species and the number of atoms except for the change in the electronic structure.

According to the butyl rubber of the first aspect of the present invention, the conjugated diene is a compound containing conjugated double bond in the molecular structure. Preferably, the conjugated diene is selected from a group consisting of compound shown in Formula II,

(Formula II)

in Formula II, $R_2$, $R_3$ and $R_4$ are the same or different and each is selected from a group consisting of hydrogen and linear or branched alkyl group of $C_1$-$C_5$.

Specific examples of the conjugated diene may include, but are not limited to, butadiene and/or isoprene.

According to the butyl rubber of the first aspect of the present invention, the aryl olefin is a substance in which at least one hydrogen atom in the olefin is substituted with aryl group. Specifically, the aryl olefin may be compound shown in Formula I:

(Formula I)

in Formula I, $R_1$ is an aryl group of $C_6$-$C_{20}$, specifically selected from a group consisting of phenyl, o-tolyl, m-tolyl, p-tolyl, o-ethylphenyl, m-ethylphenyl, p-ethylphenyl, o-tert-butylphenyl, m-tert-butylphenyl, p-tert-butylphenyl, p-dodecylphenyl, 2,4-di-n-butylphenyl, p-n-propylphenyl and 2,4-diethylphenyl.

Specific examples of the aryl olefin may include, but are not limited to, one or two or more of styrene, 2-methylstyrene, 4-methylstyrene, 4-tert-butylstyrene, 4-ethylstyrene, 3,5-diethylstyrene, 3,5-di-n-butyl styrene, 4-n-propyl styrene and 4-dodecyl styrene.

Preferably, the aryl olefin is styrene.

The butyl rubber according to the first aspect of the present invention, comprising structural unit derived from conjugated diene, and at least a part of the conjugated diene is isoprene. The structural unit is a structural unit containing a carbon-carbon double bond, and the butyl rubber can be modified by the carbon-carbon double bond in the structural unit, thereby improving the properties of the butyl rubber and/or endowing the butyl rubber with new properties. For example, a halogen atom can be introduced into the butyl rubber by using the carbon-carbon double bond to form a halogenated butyl rubber.

According to the butyl rubber of the first aspect of the present invention, the content of the structural unit derived from conjugated diene can be selected depending on the specific application of the butyl rubber. In one embodiment, the content of the structural unit derived from conjugated diene in the butyl rubber may be 0.5 to 2.5 mol %, for example, 0.5 mol %, 0.6 mol %, 0.7 mol %, 0.8 mol %, 0.9 mol %, 1.0 mol %, 1.1 mol %, 1.2 mol %, 1.3 mol %, 1.4 mol %, 1.5 mol %, 1.6 mol %, 1.7 mol %, 1.8 mol %, 1.9 mol %, 2.0 mol %, 2.1 mol %, 2.2 mol %, 2.3 mol %, 2.4 mol %, or 2.5 mol %. Preferably, the content of the structural unit derived from conjugated diene in the butyl rubber is 0.8 to 2 mol %.

More preferably, the content of the structural unit derived from conjugated diene in the butyl rubber is 1 to 1.8 mol %. In this embodiment, the structural unit derived from conjugated diene may be structural unit derived from isoprene, or may be a combination of structural unit derived from isoprene and structural unit derived from conjugated diene other than isoprene such as butadiene. In general, in the butyl rubber according to the first aspect of the present invention, the content of the structural unit derived from isoprene may be 0.5 to 2.5 mol %, for example, 0.5 mol %, 0.6 mol %, 0.7 mol %, 0.8 mol %, 0.9 mol %, 1 mol %, 1.1 mol %, 1.2 mol %, 1.3 mol %, 1.4 mol %, 1.5 mol %, 1.6 mol %, 1.7 mol %, 1.8 mol %, 1.9 mol %, 2 mol %, 2.1 mol %, 2.2 mol %, 2.3 mol %, 2.4 mol %, or 2.5 mol %. Preferably, in the butyl rubber according to the first aspect of the present invention, the content of the structural unit derived from isoprene is 0.8 to 2 mol %. More preferably, in the butyl rubber according to the first aspect of the present invention, the content of the structural unit derived from isoprene is 1 to 1.8 mol %. The butyl rubber according to this embodiment is particularly suitable for the preparation of an automobile tire inner tube and/or a curing bladder. In the present invention, the content of the structural unit derived from conjugated diene and the content of the structural unit derived from isoprene in the butyl rubber are measured by H-nuclear magnetic resonance spectroscopy (H-NMR). The butyl rubber according to the first aspect of the present invention may comprise structural unit derived from aryl olefin or may not comprise structural unit derived from aryl olefin. In a preferred embodiment, the butyl rubber contains structural unit derived from aryl olefin. In this preferred embodiment, based on the total amount of the butyl rubber, the content of the structural unit derived from aryl olefin may be 0.01 to 3 mol %, for example, 0.01 mol %, 0.02 mol %, 0.03 mol %, 0.04 mol %, 0.05 mol %, 0.06 mol %, 0.07 mol %, 0.08 mol %, 0.09 mol %, 0.1 mol %, 0.2 mol %, 0.3 mol %, 0.4 mol %, 0.5 mol %, 0.6 mol %, 0.7 mol %, 0.8 mol %, 0.9 mol %, 1 mol %, 1.1 mol %, 1.2 mol %, 1.3 mol %, 1.4 mol %, 1.5 mol %, 1.6 mol %, 1.7 mol %, 1.8 mol %, 1.9 mol %, 2 mol %, 2.1 mol %, 2.2 mol %, 2.3 mol %, 2.4 mol %, 2.5 mol %, 2.6 mol %, 2.7 mol %, 2.8 mol %, 2.9 mol %, or 3 mol %. Preferably, the content of the structural unit derived from aryl olefin is 0.05 to 2.8 mol %, based on the total amount of the butyl rubber. In a more preferred embodiment, based on the total amount of the butyl rubber, the content of the structural unit derived from aryl olefin is 0.01 to 1 mol %, preferably 0.05 to 0.6 mol %, more preferably 0.1 to 0.5 mol %. In the present invention, the content of the structural unit derived from aryl olefin in the butyl rubber is measured by H-nuclear magnetic resonance spectroscopy. According to the butyl rubber of the first aspect of the present invention, a part of the structural unit derived from conjugated diene serves as a grafting site such that a part of the molecular chain of the butyl rubber is a grafted chain. The grafted chain comprises a main chain and a branch that is bonded to a grafting site on the main chain.

The main chain of the grafted chain contains structural unit derived from conjugated diene and optionally structural unit derived from aryl olefin. The grafting site in the grafted chain for bonding the main chain to the branch is typically a carbon-carbon double bond of structural unit derived from a conjugated diene, such as a carbon-carbon double bond in a structural unit formed by 1,2-polymerization and/or 3,4-polymerization of the conjugated diene. In the main chain of the grafted chain, the conjugated diene may be the conjugated diene as described above. Preferably, in the main chain of the grafted chain, the conjugated diene is preferably butadiene and/or isoprene.

In a preferred embodiment, the main chain of the grafted chain comprises structural unit derived from conjugated diene and structural unit derived from aryl olefin. In a more preferred embodiment, the main chain of the grafted chain comprises structural unit derived from conjugated diene and structural unit derived from styrene.

When the main chain of the grafted chain contains a structural unit derived from conjugated diene and structural unit derived from aryl olefin, the structural unit derived from conjugated diene and the structural unit derived from aryl olefin may be in a random distribution or in the form of a block, and there is not particularly limited.

In a preferred embodiment, the main chain of the grafted chain is derived from styrene-butadiene copolymer and styrene-isoprene copolymer. The styrene-butadiene copolymer and the styrene-isoprene copolymer each may be a random copolymer or a block copolymer, and may also be a mixture of a random copolymer and a block copolymer, and there is not particularly limited.

The branch of the grafted chain generally contains structural unit derived from isobutylene and structural unit derived from isoprene.

According to the butyl rubber of the first aspect of the present invention, the remaining molecular chain is generally a linear chain. The linear chain contains a structural unit derived from isobutylene and a structural unit derived from isoprene.

Compared with the commercial butyl rubber, the butyl rubber according to the first aspect of the present invention has a higher content of high-molecular-weight components. Generally, in the butyl rubber according to the first aspect of the present invention, the content of a polymer of which Log (MW) is greater than or equal to 6 is 30 to 80% by weight, for example, 30% by weight, 31% by weight, 32% by weight, 33% by weight, 34% by weight, 35% by weight, 36% by weight, 37% by weight, 38% by weight, 39% by weight, 40% by weight, 41% by weight, 42% by weight, 43% by weight, 44% by weight, 45% by weight, 46% by weight, 47% by weight, 48% by weight, 49% by weight, 50% by weight, 51% by weight, 52% by weight, 53% by weight, 54% by weight, 55% by weight, 56% by weight, 57% by weight, 58% by weight %, 59% by weight, 60% by weight, 61% by weight, 62% by weight, 63% by weight, 64% by weight, 65% by weight, 66% by weight, 67% by weight, 68% by weight, 69% by weight, 70% by weight 71% by weight, 72% by weight, 73% by weight, 74% by weight, 75% by weight, 76% by weight, 77% by weight, 78% by weight, 79% by weight, or 80% by weight. Preferably, in the butyl rubber, the content of the polymer of which Log (MW) is greater than or equal to 6 is 35 to 75% by weight. More preferably, in the butyl rubber, the content of the polymer of which Log (MW) is greater than or equal to 6 is 40 to 70% by weight.

Compared with the commercial butyl rubber, the butyl rubber according to the first aspect of the present invention has a significantly increased molecular weight. Generally, the butyl rubber according to the first aspect of the present invention has a peak molecular weight of 900,000 to 2.6 million, for example, 900,000, 950,000, 1,000,000, 1.05 million, 1.1 million, 1.15 million, 1.2 million. 1.25 million, 1.3 million, 1.35 million, 1.4 million, 1.45 million, 1.5 million, 1.55 million, 1.6 million, 1.65 million, 1.7 million, 1.75 million, 1.8 million, 1.85 million, 1.9 million, 1.95 million, 2 million, 2.05 million, 2.1 million, 2.15 million, 2.2 million, 2.25 million, 2.3 million, 2.35 million, 2.4 million, 2.45 million, 2.5 million, 2.55 million, or 2.6 million. Preferably, the butyl rubber according to the first aspect of the present invention has a peak molecular weight of 950,000 to 2.3 million. More preferably, the butyl rubber according to the first aspect of the present invention has a peak molecular weight of 1,000,000 to 2.1 million. Further preferably, the butyl rubber according to the first aspect of the present invention has a peak molecular weight of 1.1 million to 1.9 million.

According to the butyl rubber of the first aspect of the present invention, the butyl rubber has a Z-average molecular weight ($M_z$) of 3 million to 7 million, for example, 3 million, 3.5 million, 4 million, 4.5 million, 5 million, 5.5 million, 6 million, 6.5 million, or 7 million. Preferably, the butyl rubber has a Z-average molecular weight of 3.5 million to 6.5 million. More preferably, the butyl rubber has a Z-average molecular weight of 3.9 million to 6 million.

According to the butyl rubber of the first aspect of the present invention, the butyl rubber has a $M_z/M_w$ ($M_w$ is a weight-average molecular weight) of 1.8 to 5, for example, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5. Preferably, the butyl rubber has a $M_z/M_w$ of 2 to 4.5. More preferably, the butyl rubber has a $M_z/M_w$ of 2.2 to 4. Further preferably, the butyl rubber has a $M_z/M_w$ of 2.2 to 3.5. The butyl rubber has a $M_w/M_n$ of 3 to 8, for example: 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or 8. Preferably, the butyl rubber has a $M_w/M_n$ of 3.3 to 7.5. More preferably, the butyl rubber has a $M_w/M_n$ of 3.5 to 7. Further preferably, the butyl rubber has a $M_w/M_n$ of 3.5 to 6.

According to the butyl rubber according to the first aspect of the present invention, the molecular weight of the butyl rubber exhibits a bimodal distribution, and in the gel permeation chromatogram, the elution peak has a shoulder peak on the high molecular weight side, and the shoulder peak is called as the "high molecular weight shoulder peak" in present invention. According to the butyl rubber of the first aspect of the present invention, the Log (MW) value of the high molecular weight shoulder peak is between 6 and 7.5, for example, the Log (MW) of the high molecular weight shoulder peak lies in 6, 6.1, 6.2, 6.3, 6.4, 6.5, 6.6, 6.7, 6.8, 6.9, 7, 7.1, 7.2, 7.3, 7.4, or 7.5. According to the butyl rubber of the first aspect of the present invention, the high-molecular-weight component is mainly derived from the grafted chain described above.

In the present invention, the molecular weight and molecular weight distribution of the butyl rubber are measured by a multi-detection combined gel permeation chromatography method, the specific method uses a TDA302 liquid phase gel permeation chromatograph manufactured by Viscotek in USA for measurement, and the gel permeation chromatograph is equipped with a differential detector, a light scattering detector, and a viscosity detector, and the chromatographic column is a two-column combination of TSKgel $GMH_{HR}$-L and TSKgel $GMH_{HR}$-H from TOSOH. The mobile phase is tetrahydrofuran at a flow rate of 1.0 mL/min; the sample solution concentration is 0.8 mg/mL; and the test temperature is 30° C. The Log (MW) value of the high molecular weight shoulder peak and the content of the polymer of which Log (MW) is greater than or equal to 6 are determined by the differential distribution curve in the graph obtained by the difference detector with log (MW) as the abscissa and dWf/d Log (MW) as the ordinate, wherein MW refers to the molecular weight, in terms of Dalton (Da). In the present invention, the peak molecular weight ($M_p$) refers to a molecular weight value corresponding to the maximum concentration of the polymer in the spectrum of the concentration of the polymer to the elution time as measured by gel permeation chromatography.

According to the butyl rubber of the first aspect of the present invention, the butyl rubber (i.e. the raw rubber of the butyl rubber) has a Mooney viscosity ML (1+8) 125° C. of 30-70, for example, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70. Preferably, the butyl rubber (i.e. the raw rubber of the butyl rubber) has a Mooney viscosity ML (1+8) 125° C. of 40-60.

In the present invention, the Mooney viscosity of the butyl rubber is measured at 125° C. (1+8) by using a GT-7080-S2 Mooney viscometer commercially available from Taiwan GOTECH TESTING MACHINES INC. by the method specified in GB/T1232.1-2000.

The butyl rubber according to the first aspect of the present invention has more excellent compounding properties than that of the conventional butyl rubber, and under the condition that the Mooney viscosity is basically the same, the power consumption of the compounding can be effectively reduced, and the additive agent is more uniformly dispersed. The butyl rubber according to the first aspect of the present invention exhibits a lower shearing viscosity and a lower extrusion swell ratio than those of the prior butyl rubber, thereby achieving better processing fluidity, and is more suitable for the injection process, and the prepared products also have better dimensional stability.

According to a second aspect of the present invention, the present invention provides a preparation method of a butyl rubber, comprising a step of contacting isobutylene and isoprene with at least one grafting agent in at least one diluent in the presence of at least one Lewis acid and at least one compound capable of providing protons under cationic polymerization conditions.

According to the method of the second aspect of the invention, the amount of isobutylene and isoprene can be selected depending on the composition of the desired butyl rubber. Generally, based on the total amount of isobutylene and isoprene, the content of isobutylene may be 85 to 99% by weight, preferably from 90 to 98% by weight, more preferably from 93 to 97.5% by weight; the content of isoprene may be 1 to 15% by weight, preferably 2 to 10% by weight, more preferably 2.5 to 7% by weight.

According to the method of the second aspect of the present invention, the grafting agent comprises a polymerizable structural unit with cationically polymerizable group and an optional aryl olefin structural unit. In the present invention, the term of "cationically polymerizable group" refers to a group having a cationic polymerization activity, that is, a group capable of reacting with isobutylene and/or conjugated diene by a cationic polymerization reaction mechanism under cationic polymerization conditions, for example: the polymerizable structural unit may be a structural unit formed by conjugated diene in a 1,2-polymerization mode and/or a 3,4-polymerization mode, wherein the carbon-carbon double bond is the cationically polymerizable group. In a preferred embodiment, the grafting agent comprises a polymerizable structural unit with cationically polymerizable group and an aryl olefin structural unit. In this preferred embodiment, based on the total amount of the grafting agent, the content of the polymerizable structural unit may be 1 to 15 mol %, preferably from 2 to 14 mol %, more preferably 2.5 to 12 mol %. In this preferred embodiment, based on the total amount of the grafting agent, the content of the aryl olefin structural unit may be 20 to 98 mol %, preferably from 30 to 97 mol %, more preferably 40 to 97 mol %, further preferably 50 to 97 mol %, still more preferably 55 to 97 mol %. In the present invention, the content of the aryl olefin structural unit in the grafting agent is measured by H-nuclear magnetic resonance spectroscopy.

In the present invention, the content of the structural unit formed by conjugated diene in 1,2-polymerization and 3,4-polymerization is measured by H-nuclear magnetic resonance spectroscopy.

The polymerizable structural unit with cationically polymerizable group may be derived from conjugated diene. The conjugated diene may specifically be a compound shown in Formula II,

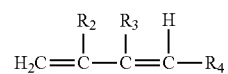

(Formula II)

in Formula II, $R_2$, $R_3$ and $R_4$ are the same or different and each is selected from a group consisting of hydrogen and linear or branched alkyl group of $C_1$-$C_5$.

Preferably, the polymerizable structural unit with the cationically polymerizable group is derived from butadiene and/or isoprene.

The aryl olefin structural unit refers to a structural unit derived from aryl olefin. The aryl olefin is a substance formed by replacing at least one hydrogen atom in olefin with aryl group. Specifically, the aryl olefin may be a compound shown in Formula I:

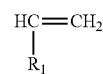

(Formula I)

in Formula I, $R_1$ is an aryl group of $C_6$-$C_{20}$, specifically selected from a group consisting of phenyl, o-tolyl, m-tolyl, p-tolyl, o-ethylphenyl, m-ethylphenyl, p-ethylphenyl, o-tertbutylphenyl, m-tert-butylphenyl, p-tert-butylphenyl, p-dodecylphenyl, 2,4-di-n-butylphenyl, p-n-propylphenyl and 2,4-diethylphenyl.

Specific examples of the aryl olefin may include, but are not limited to, one or two or more selected from a group consisting of styrene, 2-methylstyrene, 4-methylstyrene, 4-tert-butylstyrene, 4-ethylstyrene, 3,5-diethylstyrene, 3,5-di-n-butyl styrene, 4-n-propyl styrene and 4-dodecyl styrene.

In the grafting agent, the aryl olefin structural unit is preferably styrene structural unit derived from styrene.

In a preferred embodiment, the grafting agent comprises polymerizable structural unit derived from conjugated diene and styrene structural unit derived from styrene, wherein the conjugated diene preferably is butadiene and/or isoprene.

The grafting agent may have a weight-average molecular weight of 10,000 to 300,000, preferably 20,000 to 200,000, more preferably 50,000 to 180,000; and a molecular weight distribution index $M_w/M_n$ may be 1 to 2.5, preferably 1.1 to 2, more preferably 1.1 to 1.8. In the present invention, the weight-average molecular weight of the grafting agent is measured by gel permeation chromatography, and is specifically measured by a LC-20A liquid phase gel permeation chromatography instrument manufactured by Shimadzu Corporation of Japan, and the chromatographic column is three-column combination of TSKgel G2000H$_{XL}$, TSKgel G3000H$_{XL}$ and TSKgel G4000H$_{XL}$, equipped with a differential detector. The mobile phase is tetrahydrofuran at a flow rate of 1 mL/min; the sample solution concentration is 1 mg/mL, and the injection volume is 200 µL; the test temperature is 40° C.; and the single-distributed polystyrene is used as a standard sample.

According to the method of the second aspect of the invention, the grafting agent may specifically be one or a combination of two or more selected from a group consisting of styrene-butadiene copolymer and styrene-isoprene copolymer, preferably styrene-butadiene copolymer. The styrene-butadiene copolymer and the styrene-isoprene copolymer each may be a random copolymer or a block copolymer, or may be a mixture of random copolymer and block copolymer, and there is not particularly limited.

According to the method of the second aspect of the present invention, the addition amount of the grafting agent may be 0.01 to 3% by weight of isobutylene, preferably 0.1 to 2% by weight of isobutylene, more preferably 0.15 to 1% by weight of isobutylene, further preferably 0.2 to 0.8% by weight of isobutylene.

According to the method of the second aspect of the present invention, the grafting agent is added to a polymerization reaction system together with isobutylene and isoprene as the polymerization monomers. The grafting agent may be dissolved in isoprene, then is mixed with isobutylene and a diluent, and the obtained mixture is added to the polymerization reaction system; or the grafting agent may be mixed with a diluent, then mixed with isobutylene and isoprene, and the obtained mixture is added to the polymerization reaction system.

According to the method of the second aspect of the present invention, the Lewis acid is selected from a group consisting of compound shown in a Formula III, $$AlR^5_n X^1_{(3-n)} \quad \text{(Formula III)}.$$

In Formula III, $R^5$ present in a total of n are the same or different and each of $R^5$ is an alkyl group of $C_1$-$C_8$ (including a linear alkyl group of $C_1$-$C_8$ and a branched alkyl group of $C_3$-$C_8$). Specifically, each of $R^5$ present in a total of n may be selected from a group consisting of methyl, ethyl, n-propyl, isopropyl, n-butyl, sec-butyl, isobutyl, tert-butyl, n-pentyl, 2-methylbutyl, 3-methylbutyl, 2,2-dimethylpropyl, n-hexyl, 2-methylpentyl, 3-methylpentyl, 4-methylpentyl, 2,3-dimethylbutyl, 2,2-dimethylbutyl, 3,3-dimethylbutyl, 2-ethylbutyl, n-heptyl, 2-methylhexyl, 3-methylhexyl, 4-methylhexyl, 5-methylhexyl, 2,2-dimethylpentyl, 2,3-dimethylpentyl, 2,4-dimethylpentyl, 3,3-dimethylpentyl, 3,4-dimethylpentyl, 4,4-dimethylpentyl, 2-ethylpentyl, 3-ethylpentyl, n-octyl, 2-methylheptyl, 3-methylheptyl, 4-methylheptyl, 5-methylheptyl, 6-methylheptyl, 2,2-dimethylhexyl, 2,3-dimethylhexyl, 2,4-dimethylhexyl, 2,5-dimethylhexyl, 3,3-dimethylhexyl, 3,4-dimethylhexyl, 3,5-dimethylhexyl, 4,4-dimethylhexyl, 4,5-dimethylhexyl 5,5-dimethylhexyl, 2-ethylhexyl, 3-ethylhexyl, 4-ethylhexyl, 2-n-propylpentyl and 2-isopropylpentyl.

In Formula III, $X^1$ present in a total of 3-n are the same or different and each of $X^1$ is one selected from a group consisting of the halogen groups (e.g., —F, —Cl, —Br or —I), preferably —Cl.

In Formula III, n is 1, 2 or 3.

According to the method of the second aspect of the present invention, specific examples of the Lewis acid may include, but are not limited to, dichloromethylaluminum, dichloroethylaluminum, dichloro-n-propylaluminum, dichloroi sopropylaluminum, dichloro-n-butylaluminum, dichloroi sobutylaluminum, dimethylaluminum chloride, diethylaluminum chloride, di-n-propylaluminum chloride, diisopropylaluminum chloride, di-n-butylaluminum chloride, diisobutylaluminum chloride, trimethylaluminum and triethylaluminum.

Preferably, the Lewis acid is dichloroethylaluminum and/or diethylaluminum chloride. Preferably, the Lewis acid is dichloroethylaluminum.

The amount of the Lewis acid can be selected depending on the molecular weight of the desired butyl rubber. Generally, the molar ratio of the Lewis acid to isobutylene may range from 1:500 to 1:5,000, preferably from 1:1000 to 1:4,000, more preferably from 1:1500 to 1:3,500.

The compound capable of providing protons is preferably a protonic acid, and specific examples of the protonic acid may include, but are not limited to, HCl, HF, HBr, $H_2SO_4$, $H_2CO_3$, $H_3PO_4$ and $HNO_3$. Preferably, the compound capable of providing protons is HCl.

The molar ratio of the compound capable of providing protons to the Lewis acid may be from 0.01:1 to 1:1, preferably from 0.04:1 to 0.8:1, more preferably from 0.08:1 to 0.2:1, still more preferably from 0.08:1 to 0.15:1.

According to the method of the second aspect of the present invention, the initiator system comprises Lewis acid represented by Formula III and protonic acid as compound capable of providing protons, and compared with the direct use of $AlCl_3$ as an initiator, the butyl rubber prepared by the method of the second aspect of the present invention has a higher molecular weight and a higher content of high molecular weight components, and does not produce a distinct gel, and the prepared butyl rubber has more comprehensive application properties.

According to the method of the second aspect of the present invention, the diluent may be selected from a group consisting of halogenated alkane. The halogen atom in the halogenated alkane may be chlorine, bromine or fluorine, preferably chlorine or fluorine. The halogenated alkane is preferably halogenated alkane of $C_1$-$C_{10}$, more preferably halogenated alkane of $C_1$-$C_4$.

Specific examples of the diluent may include, but are not limited to, monofluoromethane, difluoromethane, trifluoromethane, carbon tetrafluoride, monochloromethane, dichloromethane, chloroform, carbon tetrachloride, monofluoroethane, difluoroethane, trifluoroethane, tetrafluoroethane, pentafluoroethane, hexafluorocarbon, monochloroethane, dichloroethane, trichloroethane, tetrachloroethane, pentachloroethane, carbon hexachloride, monofluoropropane, difluoropropane, trifluoropropane, tetrafluoropropane, pentafluoropropane, hexafluoropropane, heptafluoropropane, octafluoropropane, monochloropropane, dichloropropane, trichloropropane, tetrachloropropane, pentachloropropane, hexachloropropane, heptachloropropane, octachloropropane, monofluorobutane, difluorobutane, trifluorobutane, tetrafluorobutane, pentafluorobutane, hexafluorobutane, heptafluorobutane, octafluorobutane, nonafluorobutane, decafluorobutane, monochlorobutane, dichlorobutane, trichlorobutane, tetrachlorobutane, pentachlorobutane, hexachlorobutane, heptachlorobutane, octachlorobutane, nonachlorobutane and decachlorobutane.

The amount of the diluent can be a conventional selection. Generally, the diluent is used in an amount such that the total monomer (i.e., a monoolefin and a conjugated diene) concentration is 1 to 50% by weight, preferably 5 to 45% by weight, more preferably 10 to 40% by weight, further preferably 20 to 35% by weight.

According to the method of the second aspect of the present invention, the cationic polymerization conditions can be a conventional selection in the art. Generally, the polymerization reaction may be carried out at a temperature ranging from −120° C. to −50° C., preferably at a temperature ranging from −110° C. to −80° C., more preferably at a temperature ranging from −100° C. to −90° C.

The butyl rubber prepared by the method of the second aspect of the present invention has better mixing properties than that of the prior butyl rubber under the same Mooney viscosity, and can effectively reduce the mixing power consumption; and has a lower shearing viscosity and a lower extrusion swell ratio, so that the mixed rubber of the butyl rubber according to the present invention is easy to flow, and is more suitable for an injection molding process, and the prepared product also has better dimensional stability.

Thus, according to a third aspect of the present invention, the present invention provides a butyl rubber prepared by the method according to the second aspect of the present invention.

According to a fourth aspect of the present invention, the present invention provides a halogenated butyl rubber, comprising a rubber matrix and a halogen element bonded to the rubber matrix, wherein the rubber matrix is the butyl rubber according to the first aspect or the third aspect of the present invention.

The halogen element can be selected depending on the specific application of the halogenated butyl rubber. In one embodiment, the halogen element is a chlorine element and/or a bromine element.

The halogenated butyl rubber according to this embodiment is particularly suitable for the preparation of an automobile tire inner tube and/or an automobile tire inner liner.

The content of the halogen element may be a conventional selection. Generally, the content of the halogen atom in the halogenated butyl rubber may be in a range of 0.2 to 2 mol %, for example, 0.2 mol %, 0.3 mol %, 0.4 mol %, 0.5 mol %, 0.6 mol %, 0.7 mol %, 0.8 mol %, 0.9 mol %, 1 mol %, 1.1 mol %, 1.2 mol %, 1.3 mol %, 1.4 mol %, 1.5 mol %, 1.6 mol %, 1.7 mol %, 1.8 mol %, 1.9 mol %, or 2 mol %. Preferably, the content of the halogen atom in the halogenated butyl rubber is in a range of 0.4 to 1.5 mol %.

The halogenated butyl rubber can be prepared by a conventional method. In one example, the butyl rubber according to the present invention may be contacted with a halogen or a halogen-containing compound such that the halogen or halogen-containing compound reacts with an unsaturated group in the butyl rubber to form the halogenated butyl rubber. The contact of the butyl rubber with the halogen or the halogen-containing compound may be carried out under conventional conditions as long as the butyl rubber can be halogenated.

According to a fifth aspect of the present invention, the present invention provides a composition, comprising a butyl rubber and/or a halogenated butyl rubber, a vulcanizing agent and optionally at least one additive agent, wherein the butyl rubber is the butyl rubber according to the first aspect or the third aspect of the present invention, the halogenated butyl rubber is the halogenated butyl rubber according to the fourth aspect of the present invention.

The vulcanizing agent may be a conventional selection in the field of rubber preparation, and is not particularly limited. Specifically, the vulcanizing agent may be selected from a group consisting of sulfur, selenium, tellurium, benzoyl peroxide, ethyl carbamate, 2,5-dimethyl-2,5-di(tert-butylperoxy)hexane and vulcanization resin.

The amount of the vulcanizing agent can be appropriately selected according to the conventional knowledge in the art. Generally, the vulcanizing agent may be used in an amount of 0.1 to 10 parts by weight, preferably 0.2 to 8 parts by weight, with respect to 100 parts by weight of the butyl rubber and halogenated butyl rubber.

The composition according to the fifth aspect of the present invention may further comprise at least one additive agent, selected from a group consisting of vulcanization accelerator and carbon black.

The vulcanization accelerator may be selected from a group consisting of zinc oxide, magnesium oxide, stearic acid, diphenylguanidine, tetramethylthiuram disulfide, bis(thiocarbonyldimethylamine) disulfide, N-(1,3-dimethyl butyl)-N'-phenyl-p-phenylenediamine, N,N'-tetramethyldithiobisthiocarbonylamine, 2-thiolbenzothiazole, ethylene thiourea and N-cyclohexy-2-benzothiazole sulfenamide. The amount of vulcanization accelerator may be a conventional selection in the art. Generally, the vulcanization accelerator may be used in an amount of 2 to 10 parts by weight with respect to 100 parts by weight of the butyl rubber and halogenated butyl rubber.

The carbon black may be carbon black of various sources and types commonly used. With respect to 100 parts by weight of the butyl rubber and halogenated butyl rubber, the content of the carbon black may be 20 to 70 parts by weight, preferably 30 to 60 parts by weight, more preferably 40 to 60 parts by weight.

According to a sixth aspect of the present invention, the present invention provides a rubber product, formed by vulcanizing the composition according to the fifth aspect of the present invention.

The vulcanization may be carried out under conventional conditions in the art, and is not particularly limited.

The vulcanization can be carried out in a vulcanization apparatus which is commonly used in the art, and is not particularly limited.

The rubber product according to the sixth aspect of the present invention has good comprehensive properties, such as a low dimensional shrinkage, a high tear strength and fatigue resistance, and is suitable as an automobile tire inner liner, an automobile tire inner tube and a curing bladder, particularly suitable as the curing bladder.

Thus, according to a seventh aspect of the present invention, the present invention provides an application of the butyl rubber according to the first aspect or the third aspect of the present invention, the halogenated butyl rubber according to the fourth aspect of the present invention, the composition according to the fifth aspect of the invention, and the rubber product according to the sixth aspect of the invention in the preparation of an automobile tire inner liner, an automobile tire inner tube and a curing bladder.

According to an eighth aspect of the present invention, the present invention provides an automobile tire inner liner, formed by the butyl rubber according to the first aspect or the third aspect of the invention, the halogenated butyl rubber according to the fourth aspect of the invention, the composition according to the fifth aspect of the invention or the rubber product according to the sixth aspect of the invention.

According to a ninth aspect of the present invention, the present invention provides an automobile tire inner tube, formed by the butyl rubber according to the first aspect or the third aspect of the present invention, the halogenated butyl rubber according to the fourth aspect of the present invention, the composition according to the fifth aspect of the present invention or the rubber product according to the sixth aspect of the present invention.

According to a tenth aspect of the present invention, the present invention provides a curing bladder, formed by the butyl rubber according to the first aspect or the third aspect of the present invention, the composition of the fifth aspect of the present invention or the rubber product of the sixth aspect of the present invention.

The curing bladder according to the present invention exhibits superior use properties and longer service life than the prior curing bladder.

The present invention also provides a butyl rubber, comprising structural unit derived from isobutylene, structural unit derived from conjugated diene, and structural unit derived from aryl olefin, wherein at least a part of the conjugated diene is isoprene, and the aryl olefin is selected from a group consisting of compound shown in Formula I,

(Formula I)

in Formula I, $R_1$ is an aryl group of $C_6$-$C_{20}$;

in the butyl rubber, the content of the structural unit derived from conjugated diene is 0.5 to 2.5 mol %, and based on the total amount of the butyl rubber, the content of the structural unit derived from aryl olefin is 0.01 to 1 mol %, preferably 0.05 to 0.6 mol %, more preferably 0.1 to 0.5 mol %;

in the butyl rubber, a part of structural unit derived from the conjugated diene is used as a grafting site such that a part of the molecular chain of the butyl rubber is a grafted chain, and a remaining part of the molecular chain of the butyl rubber is a linear chain;

the molecular weight of the butyl rubber exhibits bimodal distribution, the Log (MW) value of the high molecular weight shoulder peak is 6 to 7.5, and the content of the butyl rubber of which Log (MW) is greater than or equal to 6 is 30 to 80% by weight, preferably 30 to 70% by weight, more preferably 30 to 60% by weight; the butyl rubber has a Z-average molecular weight of 2,000,000 to 7,000,000, preferably 3,000,000 to 6,500,000, more preferably 4,000,000 to 6,000,000, and $M_z/M_w$ is 1.8 to 5, preferably 2 to 4.5, more preferably 2.2 to 4, further more preferably 2.2 to 3.5, $M_w/M_n$ is 3 to 8, preferably 3.3 to 7.5, more preferably 3.5 to 7, further more preferably 3.5 to 6. The butyl rubber has a Mooney viscosity ML(1+8) of 30 to 70 at 125° C., preferably 40 to 60 at 125° C.

The main chain of the grafted chain comprises structural unit derived from conjugated diene and structural unit derived from aryl olefin, preferably the main chain of the grafted chain contains the structural unit derived from conjugated diene and the structural unit derived from styrene, and the main chain of the grafted chain is preferably derived from styrene-butadiene polymer and styrene-isoprene polymer;

a branch of the grafted chain comprises structural unit derived from isobutylene and structural unit derived from isoprene.

The linear chain contains a structural unit derived from isobutylene and structural unit derived from isoprene.

The present invention is described in detail below with reference to the Examples, but without thereby limiting the scope of the invention.

In the following Examples and Comparison Examples, the molecular weight and molecular weight distribution information of the butyl rubber is measured by a TDA302 liquid phase gel permeation chromatograph manufactured by Viscotek in USA, which is equipped with a differential detector, a light scattering detector, and a viscosity detector, the chromatographic column is a two-column combination of TSKgel GMH$_{HR}$-L and TSKgel GMH$_{HR}$-H from TOSOH. The mobile phase is tetrahydrofuran at a flow rate of 1.0 mL/min; the sample solution concentration is 0.8 mg/mL; and the test temperature is 30° C.

In the following Examples and Comparative Examples, the weight-average molecular weight of the grafting agent is measured by gel permeation chromatography, and is specifically measured by a LC-20A liquid phase gel permeation chromatography instrument manufactured by Shimadzu Corporation of Japan, and the chromatographic column is three-column combination of TSKgel G2000H$_{XL}$, TSKgel G3000H$_{XL}$ and TSKgel G4000H$_{XL}$, equipped with a differential detector. The mobile phase is tetrahydrofuran at a flow rate of 1 mL/min; the sample solution concentration is 1 mg/mL, and the injection volume is 200 μL; the test temperature is 40° C.; and the single-distributed polystyrene is used as a standard sample.

In the following Examples and Comparative Examples, an AVANCE 400 nuclear magnetic resonance instrument commercially available from Bruker of Switzerland is used, wherein a magnetic field strength is 9.40 tesla, CDCl$_3$ is used as a solvent and TMS is used as an internal standard, and the microstructure parameters of the grafting agent and the microstructure parameters of the prepared butyl rubber are measured at room temperature (25° C.), and the microstructure parameters of the prepared butyl rubber includes total unsaturation (i.e., the content of the structural unit formed by the conjugated diene in the prepared butyl rubber), the content of the structural unit derived from isoprene and the content of the structural unit derived from styrene.

In the following Examples and Comparative Examples, the Mooney viscosity and stress relaxation test is measured with a large rotor by using a GT-7080-52 Mooney viscometer commercially available from Taiwan GOTECH TESTING MACHINES INC., referring to the method of GB/T1232.1-2000 under the condition of 125° C. (1+8), wherein the Mooney relaxation time is 120 s.

In the following Examples and Comparative Examples, the extrusion swell ratio of the mixed rubber is measured by an RH2000 capillary rheometer manufactured by Malvern of UK, at a temperature of 100° C., with a length to diameter ratio of 16:1, and a shearing rate of 10 to 1000 s$^{-1}$.

In the following Examples and Comparative Examples, the mixed rubber formula refers to an SH/T1717-2008 standard formula: 100 g of butyl rubber, 50 g of 8 #carbon black, 1 g of stearic acid, 3 g of zinc oxide, 1.75 g of sulfur, and 1.0 g of tetramethylthiuram disulfide TMTD, totaling 156.75 g. The mixing process is as follows:

(1) Performing first-stage feeding of all butyl rubbers (a BR1600 internal mixer, 50° C., 77 rpm), performing masticating for 0.5 min, raising a ram piston, adding stearic acid, zinc oxide, 8# carbon black, performing mixing for 0.5 min, then putting down the ram piston, performing mixing for 4.0 min, and performing rubber discharging while controlling the temperature below 150° C.; and (2) Performing second-stage feeding of ½ masterbatch+ S+TMTD+½ masterbatch (a BR1600 internal mixer, 40±5° C., 77 rpm), after 0.5 min, putting down the ram piston, performing internal mixing for 2.5 min, performing rubber discharging while controlling the temperature below 110° C., performing thin-pass for 6 times through an open mill with a roller spacing of 0.8 mm at a temperature of 40° C., after 2 minutes, performing sheeting rolling, performing thin-pass for 4 times at a roller spacing of 6 mm at normal temperature for 1 min.

The vulcanization characteristics of the mixed rubber are measured by a GT-M2000A type non-rotor vulcanizer manufactured by Taiwan GOTECH TESTING MACHINES INC., and the vulcanization characteristics of the mixed rubber are measured according to the method specified in GB/T16584-1996.

The physical and mechanical properties of the mixed rubber after vulcanization are tested by a GT-AT-3000 universal tensile machine manufactured by Taiwan GOTECH TESTING MACHINES INC.; the tensile stress and strain properties of the rubber compound are tested according to GB/T 528-2009; the tear strength of the rubber compound is tested according to GB/T 529-2008; and the Shore A hardness is tested according to GB/T531.1-2008.

The airtightness of the mixed rubber after vulcanization is measured by an automatic airtightness tester; the gas permeability coefficient of the vulcanized rubber is measured according to ISO 2782:1995; the test gas is N$_2$; the test temperature is 23° C.; the test sample piece is a circular slice of 8 cm in diameter; and the thickness is 1 mm.

Examples 1 to 15 are used to illustrate the butyl rubber of the present invention and a preparation method thereof.

Example 1

Full tank operation is performed on a continuous polymerization tank with a capacity of 2 t/h, wherein through the tube bundle cooling in the polymerization tank by liquid ethylene of –110° C., the polymerization temperature in the tank is controlled to be –95° C. to –100° C., two feeds exist at the bottom of the polymerization tank, and the two feeds enter the tank at the same time, with a feed temperature of –95° C. Wherein, a feed 1 is a monomer solution feed, which is obtained by mixing isoprene in which styrene-butadiene resin is dissolved, with methyl chloride and isobutylene; a feed 2 is an initiator solution feed. Feeding is performed according to the feed conditions of switch 2 in Table 1, the top of the polymerization tank is a slurry discharge, and no obvious gel formation occurs during the polymerization, and the polymer slurry is subjected to agglomeration through a degassing kettle and post-treatment drying to obtain a butyl rubber according to the present invention, the structure and property parameters of which are listed in Table 7.

Comparison Example 1

Polymerization is carried out in the same manner as in Example 1, except that the butyl rubber (i.e., a butyl rubber commercially available under a brand name of IIR1751) is obtained when feeding is performed according to the switch 1 in Table 1, and the structure and property parameters thereof are listed in the Table 7.

TABLE 1

| Feed | Item name | Switch 1, kg/h | Switch 2, kg/h |
|---|---|---|---|
| Feed 1 | Methyl chloride | 6048 | 6048 |
|  | Isobutylene | 2352 | 2352 |
|  | Isoprene | 68 | 73 |
|  | Styrene-butadiene resin[1] | 0 | 7 |
| Feed 2 | Ethylaluminum dichloride (EADC) | 2 | 2 |
|  | HCl | 0.060 | 0.060 |
|  | Methyl chloride | 1000 | 1000 |

[1]purchased from Phillips, wherein the brand name is KR01, the weight-average molecular weight is 114000, the molecular weight distribution index ($M_w/M_z$) is 1.35, the content of the structural unit derived from butadiene in the styrene-butadiene resin is 39.5 mol %, and the content of the structural unit formed by butadiene in a 1,2-polymerization manner is 4.6 mol %.

Example 2

A butyl rubber is prepared in the same manner as in Example 1, except that feeding is performed according to the conditions of Table 2. No obvious gel formation occurs during the polymerization. The butyl rubber according to the present invention is prepared, and the structure and property parameters of the butyl rubber are listed in Table 7.

TABLE 2

| Feed | Item name | Feeding, kg/h |
|---|---|---|
| Feed 1 | Methyl chloride | 5658 |
|  | Isobutylene | 2352 |
|  | Isoprene | 73 |
|  | Styrene-butadiene resin[1] | 9 |
| Feed 2 | Ethylaluminum dichloride (EADC) | 2.2 |
|  | HCl | 0.065 |
|  | Methyl chloride | 1000 |

[1]purchased from Phillips, wherein the brand name is KR01, the weight-average molecular weight is 114000, the molecular weight distribution index is 1.35, the content of the structural unit derived from butadiene in the styrene-butadiene resin is 39.5 mol %, and the content of the structural unit formed by butadiene in a 1,2-polymerization manner is 4.6 mol %.

Example 3

A butyl rubber is prepared in the same manner as in Example 1, except that feeding is performed according to the conditions of Table 3. No obvious gel formation occurs during the polymerization. The butyl rubber according to the present invention is prepared, and the structure and property parameters of the butyl rubber are listed in Table 7.

TABLE 3

| Feed | Item name | Feeding, kg/h |
|---|---|---|
| Feed 1 | Methyl chloride | 5148 |
|  | Isobutylene | 2352 |
|  | Isoprene | 70 |
|  | Styrene-butadiene resin[1] | 11 |

TABLE 3-continued

| Feed | Item name | Feeding, kg/h |
| --- | --- | --- |
| Feed 2 | Ethylaluminum dichloride (EADC) | 2.2 |
|  | HCl | 0.06 |
|  | Methyl chloride | 800 |

[1]purchased from Maoming Zhonghe, wherein the brand name is SL-803, the weight-average molecular weight is 124700, the molecular weight distribution index is 1.38, the content of the structural unit derived from butadiene in the styrene-butadiene resin is 36.2 mol %, and the content of the structural unit formed by butadiene in a 1,2-polymerization manner is 4.8 mol %.

Example 4

A butyl rubber is prepared in the same manner as in Example 1, except that feeding is performed according to the conditions of Table 4. No obvious gel formation occurs during the polymerization. The butyl rubber according to the present invention is prepared, and the structure and property parameters of the butyl rubber are listed in Table 7.

TABLE 4

| Feed | Item name | Feeding, kg/h |
| --- | --- | --- |
| Feed 1 | Methyl chloride | 5660 |
|  | Isobutylene | 2350 |
|  | Isoprene | 78 |
|  | Styrene-butadiene resin[1] | 11 |
| Feed 2 | Ethylaluminum dichloride (EADC) | 2 |
|  | HCl | 0.070 |
|  | Methyl chloride | 1000 |

[1]purchased from Phillips, wherein the brand name is KR03, the weight-average molecular weight is 159400, the molecular weight distribution index is 1.68, the content of the structural unit derived from butadiene in the styrene-butadiene resin is 38.2 mol %, and the content of the structural unit formed by butadiene in a 1,2-polymerization manner is 4.6 mol %.

Example 5

Full tank operation is performed on a continuous polymerization tank with a capacity of 2 t/h, wherein through the tube bundle cooling in the polymerization tank by liquid ethylene of −110° C., the polymerization temperature in the tank is controlled to be −95° C. to −100° C., two feeds exist at the bottom of the polymerization tank, and the two feeds enter the tank at the same time, with a feed temperature of −95° C. Wherein, a feed 1 is a monomer solution feed, which is obtained by mixing isoprene in which styrene-butadiene resin is dissolved, with methyl chloride and isobutylene; a feed 2 is an initiator solution feed.

Feeding is performed according to the feed conditions in Table 5, the top of the polymerization tank is a slurry discharge, and no obvious gel formation occurs during the polymerization, and the polymer slurry is subjected to agglomeration through a degassing kettle and post-treatment drying to obtain a butyl rubber according to the present invention, the structure and property parameters of which are listed in Table 7.

TABLE 5

| Feed | Item name | Feeding, kg/h |
| --- | --- | --- |
| Feed 1 | Methyl chloride | 5682 |
|  | Isobutylene | 2394 |
|  | Isoprene | 76 |
|  | Styrene-butadiene resin[1] | 6.5 |

TABLE 5-continued

| Feed | Item name | Feeding, kg/h |
| --- | --- | --- |
| Feed 2 | Ethylaluminum dichloride (EADC) | 2.5 |
|  | HCl | 0.075 |
|  | Methyl chloride | 1000 |

[1]purchased from BASF, wherein the brand name is GH62, the weight-average molecular weight is 155800, the molecular weight distribution index is 1.54, the content of the structural unit derived from butadiene in styrene-butadiene resin is 42.4 mol %, and the content of the structural unit formed by butadiene in a 1,2-polymerization manner is 5.1 mol %.

Example 6

Full tank operation is performed on a continuous polymerization tank with a capacity of 2 t/h, wherein through the tube bundle cooling in the polymerization tank by −110° C. liquid ethylene, the polymerization temperature in the tank is controlled to be −95° C. to −100° C., two feeds exist at the bottom of the polymerization tank, and the two feeds enter the tank at the same time, with a feed temperature of −98° C. Wherein, a feed 1 is a monomer solution feed, which is obtained by mixing isoprene in which styrene-butadiene resin is dissolved, with methyl chloride and isobutylene; a feed 2 is an initiator solution feed.

Feeding is performed according to the feed conditions in Table 6, the top of the polymerization tank is a slurry discharge, and no obvious gel formation occurs during the polymerization, and the polymer slurry is subjected to agglomeration through a degassing kettle and post-treatment drying to obtain a butyl rubber according to the present invention, the structure and property parameters of which are listed in Table 7.

TABLE 6

| Feed | Item name | Feeding, kg/h |
| --- | --- | --- |
| Feed 1 | Methyl chloride | 5436 |
|  | Isobutylene | 2677 |
|  | Isoprene | 94 |
|  | Styrene-butadiene resin[1] | 14 |
| Feed 2 | Ethylaluminum dichloride (EADC) | 2.4 |
|  | HCl | 0.06 |
|  | Methyl chloride | 900 |

[1]purchased from Phillips, wherein the brand name is KR01, the weight-average molecular weight is 114000, the molecular weight distribution index is 1.35, the content of the structural unit derived from butadiene in the styrene-butadiene resin is 39.5 mol %, and the content of the structural unit formed by butadiene in a 1,2-polymerization manner is 4.6 mol %.

Comparison Example 2

A commercially available butyl rubber with a brand name of IIR268 manufactured by ExxonMobil is used.

Figure 2:
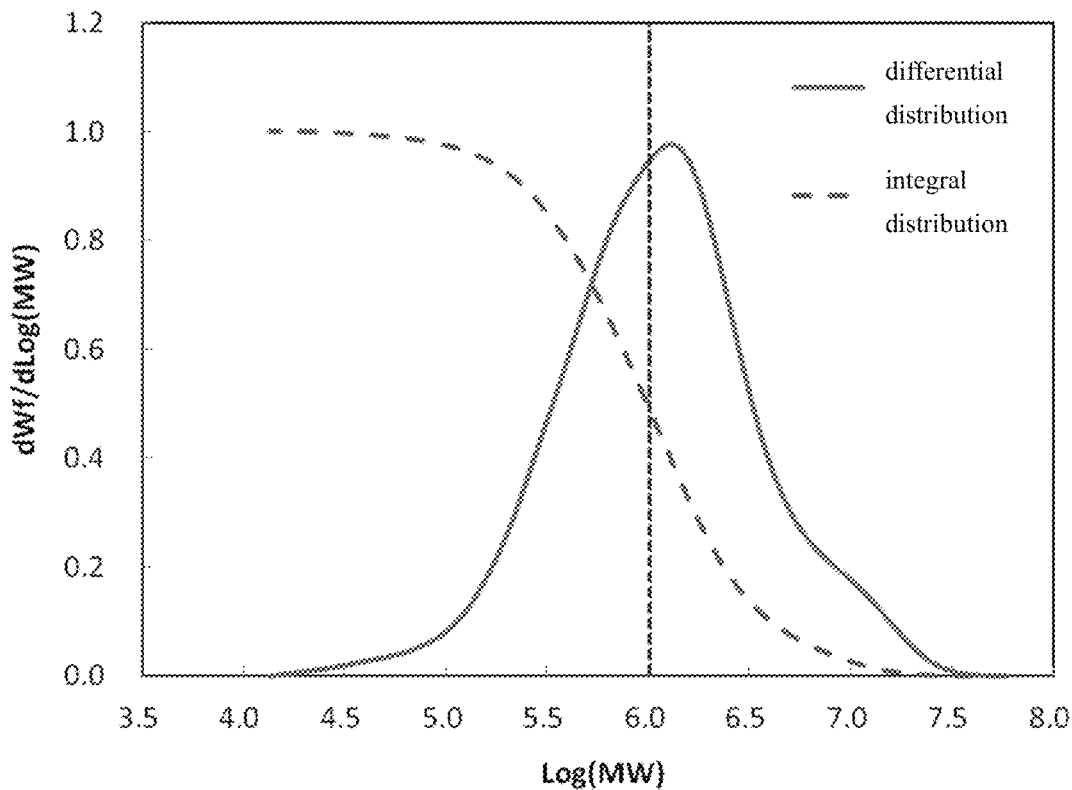
FIG. 2 is a gel permeation chromatogram of the butyl rubber prepared in Example 4.
Figure 3:
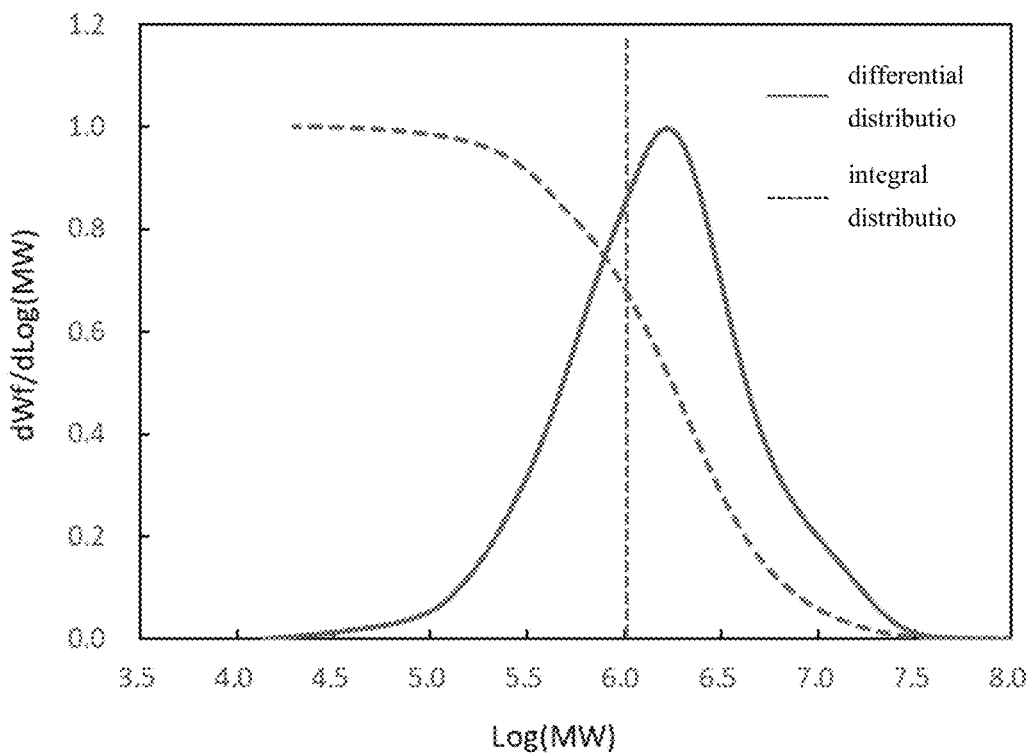
FIG. 3 is a gel permeation chromatogram of the butyl rubber prepared in Example 6.

FIGS. 1-3 are GPC plots of the butyl rubbers prepared in Examples 2, 4 and 6, respectively.

As can be seen from Table 7 and FIGS. 1 to 3, the butyl rubber according to the present invention has a higher molecular weight.

TABLE 7

| No. | Multi-detection GPC measurement results | | | | | | Total unsaturation[2]/ mol % | Styrene content[3]/ mol % | Isoprene content[5]/ mol % | Raw rubber Mooney viscosity ML(1 + 8) 125° C. |
|---|---|---|---|---|---|---|---|---|---|---|
| | $M_p$ | $M_z$ | $M_w/M_n$ | $M_z/M_w$ | LogM ≥ 6%[1] | Log (MW)[4] | | | | |
| Example 1 | 1032600 | 5994000 | 5.60 | 3.08 | 32.3% | 6.0-7.5 | 1.40 | 0.25 | 1.31 | 48.3 |
| Example 2 | 1187300 | 5104000 | 3.43 | 2.23 | 41.2% | 6.0-7.5 | 1.37 | 0.33 | 1.24 | 50.6 |
| Example 3 | 1511000 | 5815000 | 4.82 | 2.95 | 58.1% | 6.0-7.5 | 1.26 | 0.28 | 1.19 | 42.3 |
| Example 4 | 1472600 | 5602000 | 5.92 | 2.87 | 50.4% | 6.0-7.5 | 1.52 | 0.41 | 1.35 | 56.8 |
| Example 5 | 1094200 | 5811000 | 4.78 | 2.95 | 37.2% | 6.0-7.5 | 1.39 | 0.22 | 1.28 | 46.7 |
| Example 6 | 1754000 | 5504000 | 4.60 | 2.44 | 68.3% | 6.0-7.5 | 1.44 | 0.31 | 1.27 | 53.2 |
| Comparison Example 1 | 893700 | 1336400 | 3.27 | 1.54 | 17.1% | — | 1.62 | 0 | 1.62 | 53.1 |
| Comparison Example 2 | 1284600 | 2082400 | 4.02 | 1.79 | 28.5% | — | 1.54 | 0 | 1.54 | 52.0 |

[1]The content of the butyl rubber with Log (MW) ≥ 6, by mass percentage
[2]The content of the structural unit derived from conjugated diene in the prepared butyl rubber
[3]The content of the structural unit derived from styrene in the prepared butyl rubber
[4]Position of peak Log (MW) values of high molecular weight shoulder
[5]The content of the structural unit derived from isoprene in the prepared butyl rubber Test Example 1: Stress Relaxation Test The butyl rubbers prepared in Examples 1 to 6 and the butyl rubbers prepared in Comparison Example 1 and Comparison Example 2 are made into a mixed rubber, and stress relaxation test is implemented, and the Mooney viscosity and stress relaxation test results of the mixed rubber are listed in Table 8.

TABLE 8

| Items | Example 1 | Example 2 | Example 3 | Example 4 | Example 5 | Example 6 | Comparison Example 1 | Comparison Example 2 |
|---|---|---|---|---|---|---|---|---|
| Mooney viscosity/ ML1 + 8, 125° C. | 69.75 | 70.35 | 70.23 | 77.58 | 65.70 | 75.25 | 70.9 | 69.38 |
| Stress relaxation experiment | | | | | | | | |
| t80/min | 0.06 | 0.06 | 0.06 | 0.07 | 0.06 | 0.06 | 0.07 | 0.09 |
| Intercept K | 34.97 | 34.02 | 30.05 | 35.16 | 34.13 | 34.64 | 38.13 | 35.57 |
| Slope a | −0.5889 | −0.5622 | −0.4714 | −0.5434 | −0.5576 | −0.5385 | −0.5339 | −0.5120 |
| Area A | 457.79 | 466.5 | 429.8 | 522.7 | 452.4 | 471.2 | 552.35 | 537.57 |

In Table 8, the area under the stress relaxation curve can characterize the processing power consumption of the mixed rubber, wherein the smaller the area under the stress relaxation curve, the lower the processing power consumption. As can be seen from the results of Table 8, the butyl rubber according to the present invention has good compounding properties and lower processing power consumption. For example, the area under the stress relaxation curve corresponding to the mixed rubber of Examples 1 to 3 and 6 is significantly lower than that of Comparison Examples 1 and 2 under the conditions that the Mooney viscosity of the raw rubber or the mixed rubber is substantially the same.

Test Example 2: Vulcanization Characteristics of the Mixed Rubber

The butyl rubbers prepared in Examples 1 to 6 and the butyl rubbers of Comparison Examples 1 and 2 are made into a mixed rubber, and the vulcanization property test is carried out, and the experimental results are listed in Table 9.

TABLE 9

| Items | | Example 1 | Example 2 | Example 3 | Example 4 | Example 5 | Example 6 | Comparison example 1 | Comparison example 2 |
|---|---|---|---|---|---|---|---|---|---|
| No rotor Vulcanizer 160° C. | $F_H$/N · m | 20.22 | 20.44 | 18.57 | 21.07 | 20.15 | 19.60 | 20.46 | 19.66 |
| | $F_L$/N · m | 4.34 | 4.19 | 4.23 | 4.67 | 4.29 | 4.75 | 4.34 | 4.32 |
| | ts1/min | 2.01 | 1.58 | 1.72 | 1.86 | 2.04 | 1.94 | 2.01 | 2.14 |
| | t10/min | 2.20 | 2.20 | 1.96 | 2.19 | 2.24 | 2.13 | 2.18 | 2.32 |
| | t50/min | 5.38 | 5.53 | 5.22 | 5.41 | 5.72 | 5.35 | 5.49 | 6.26 |
| | t90/min | 20.07 | 21.52 | 20.16 | 21.03 | 20.88 | 19.87 | 20.27 | 22.18 |

As can be seen from the results of Table 9, the vulcanization properties of the butyl rubber according to the present invention are substantially equivalent to those of commercially available products. For example, the vulcanization properties of the butyl rubbers in Examples 1 to 3 and 6 are substantially equivalent to those of the butyl rubbers in Comparison Examples 1 and 2 under the conditions that the Mooney viscosity of raw rubber or the mixed rubber is substantially the same.

Test Example 3: Extrusion Processing Properties

Figure 4:
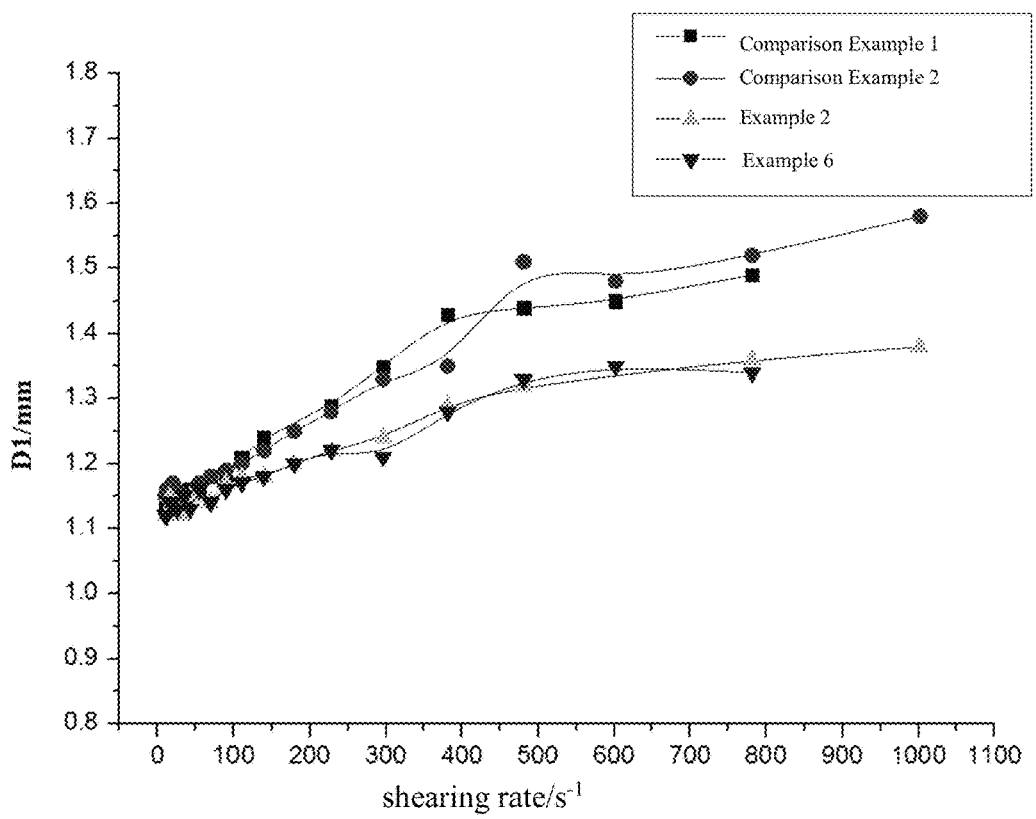
FIG. 4 is a graph showing the relationship between the extrusion swell ratio and the shearing rate at 100° C. of the mixed rubber prepared from the butyl rubbers of Examples 2 and 6 as well as Comparison Examples 1 and 2.

The butyl rubbers prepared in Example 2 and Example 6 as well as the butyl rubbers prepared in Comparison Examples 1 and 2 are respectively made into a mixed rubber, and the extrusion processing property is tested, and the experimental results are shown in FIG. 4.

As can be seen from FIG. 4, the extrusion swell ratio of the mixed rubber made of the butyl rubber according to the present invention are significantly lower than the extrusion swell ratio of the butyl rubber according to Comparison Examples 1 and 2, which indicates that the butyl rubber according to the present invention has better fluidity, better product dimensional stability and lower shrinkage.

Test Example 4: Physical and Mechanical Properties of Vulcanized Rubber

The butyl rubbers prepared in Examples 1 to 6 as well as the butyl rubbers of Comparison Examples 1 and 2 are respectively made into a mixed rubber for vulcanization (the vulcanization temperature is 150° C., and the vulcanization time is 30 min), then physical and mechanical properties are tested, and the experimental results are listed in Table 10.

Test Example 5: Vulcanized Rubber Air Tightness Test

The butyl rubbers prepared in Examples 1 to 6 and the butyl rubbers prepared in Comparison Examples 1 and 2 are respectively made into a mixed rubber for vulcanization (the vulcanization temperature is 150° C., and the vulcanization time is 30 min), then airtight properties are tested, and the experimental results are listed in Table 11.

TABLE 11

| No. | Air permeability/ $cm^3/m^2 · 24\ h · 0.1$ MPa | Transmission coefficient/ $cm^3 · cm/cm^2 · s · cmHg$ |
|---|---|---|
| Comparison Example 1 | 21.842 | $3.326 \times 10^{-11}$ |
| Comparison Example 2 | 21.058 | $3.207 \times 10^{-11}$ |
| Example 1 | 21.929 | $3.340 \times 10^{-11}$ |
| Example 2 | 21.611 | $3.291 \times 10^{-11}$ |
| Example 3 | 21.412 | $3.318 \times 10^{-11}$ |
| Example 4 | 21.442 | $3.266 \times 10^{-11}$ |
| Example 5 | 21.145 | $3.220 \times 10^{-11}$ |
| Example 6 | 21.014 | $3.116 \times 10^{-11}$ |

The results of Table 11 indicate that the vulcanized rubber prepared by the butyl rubber according to the present invention has substantially the same airtightness as those of a commercially available product.

Application Example 1: Tire Inner Tube

The butyl rubbers prepared in Examples 1, 2 and 6 as well as the butyl rubbers of Comparison Examples 1 and 2 are used to prepare a automobile tire inner tube by the following process.

100 parts by weight of butyl rubber, 5 parts by weight of ethylene-propylene rubber, 5 parts by weight of zinc oxide,

TABLE 10

| Items | Comparison Example 1 | Comparison Example 2 | Example 1 | Example 2 | Example 3 | Example 4 | Example 5 | Example 6 |
|---|---|---|---|---|---|---|---|---|
| Hardness (Shore A) | 64 | 64 | 65 | 66 | 66 | 67 | 66 | 67 |
| Tensile strength/MPa | 16.53 | 16.58 | 17.22 | 16.96 | 17.82 | 17.47 | 17.03 | 18.14 |
| tensile stress at a given elongation of 100%/MPa | 2.42 | 2.40 | 2.28 | 2.16 | 2.28 | 2.36 | 2.32 | 2.48 |
| tensile stress at a given elongation of 300%/MPa | 9.17 | 9.17 | 8.55 | 8.28 | 8.29 | 8.82 | 8.44 | 9.74 |
| Elongation at break/% | 523 | 526 | 564 | 566 | 590 | 554 | 547 | 571 |
| Permanent deformation/% | 30 | 31 | 30 | 29 | 29 | 31 | 30 | 28 |
| Tear strength/kN/m | 36 | 35 | 39 | 39 | 39 | 41 | 39 | 38 |

As can be seen from the results of Table 10, the samples prepared from the butyl rubber according to the present invention have good overall mechanical properties, particularly exhibiting higher elongation at break and tear strength.

1 part by weight of stearic acid, 58 parts by weight of carbon black, 16 parts by weight of paraffin oil, 0.5 part by weight of accelerator DM, 1 part by weight of accelerator DMTD and 1.75 parts by weight of sulfur are prepared into a tire inner tube by the process steps of mixing, mastication, injection molding, vulcanization, trimming, and the like. The property parameters of the prepared inner tube are listed in Table 12.

TABLE 12

| Items | Example 1 | Example 2 | Example 6 | Comparison example 1 | Comparison example 2 |
|---|---|---|---|---|---|
| Shore hardness/A | 51 | 52 | 54 | 54 | 52 |
| Tensile strength/MPa | 10.5 | 10.5 | 11.6 | 10.4 | 10.5 |
| Elongation at break/% | 635 | 638 | 642 | 631 | 633 |
| Specific weight | 1.12 | 1.12 | 1.12 | 1.13 | 1.12 |
| Adhesive strength of tire casing and rubber pad/MPa | 3.56 | 3.47 | 3.62 | 3.27 | 3.32 |
| Adhesive strength of rubber pad and valve/MPa | 3.7 | 3.7 | 3.8 | 3.3 | 3.4 |
| Prodcuct dimensional shrinkage/cm | ~1.2 | ~1.2 | ~1.2 | ~2.5 | ~1.8 |

The results in Table 12 show that the physical and mechanical properties of the tire inner tube prepared by the butyl rubber according to the present invention are substantially equivalent to those of commercially available products, but the dimensional shrinkage of the product is remarkably lowered.

Application Example 2: Curing Bladder

The butyl rubbers prepared in Example 2 and Example 6 as well as the butyl rubbers prepared in Comparison Examples 1 and 2 are used to prepare a curing bladder by the following process.

100 parts by weight of butyl rubber, 5 parts by weight of chloroprene rubber, 60 parts by weight of carbon black, 1 part by weight of stearic acid, 5 parts by weight of castor oil, 3 parts by weight of magnesium oxide, 5 parts by weight of zinc oxide, and 6 parts by weight of vulcanized resin are prepared into a curing bladder by the process steps of internal mixing, open milling, injection molding, vulcanization and polishing. The property parameters of the prepared curing bladder are listed in Table 13.

TABLE 13

| Items | Example 2 | Example 6 | Comparison Example 1 | Comparison Example 2 |
|---|---|---|---|---|
| Shore hardness/A | 57 | 62 | 56 | 56 |
| Breaking strength/MPa | 13.2 | 13.5 | 12.8 | 13.0 |
| Tensile stress at a given elongation of 300%/MPa | 5.0 | 5.2 | 5.8 | 6.0 |
| Elongation at break/% | 668 | 695 | 652 | 671 |
| Tear strength/kN/m | 35.7 | 38.5 | 33.4 | 34.2 |
| Service life/times | 600-750 | 550-750 | 350-550 | 500-650 |

The results of Table 13 indicate that the physical and mechanical properties of the curing bladder prepared by the butyl rubber according to the present invention are substantially comparable to those of commercially available products, but the service life of the curing bladder is remarkably improved.

Examples 7-10

In Examples 7 to 10, the butyl rubbers are prepared by the following method, and the difference between Examples 7 to 10 is that the amount of the grafting agent is different, and the specific amounts are listed in Table 14.

120 mL of a dichloromethane solution containing HCl (a concentration of 0.0044 mol/L) precooled to −80° C. is added in a 200 mL horn-shaped bottle at a temperature of −80° C., and then, 0.8 mL of a n-hexane solution of ethylaluminum dichloride (EADC) at a concentration of 0.9 mol/L and 6.4 mL of a n-heptane solution of diethylaluminum chloride (DEAC) at a concentration of 1.0 mol/L (the molar ratio of EADC to DEAC is 1/9) is sequentially added into the horn-shaped bottle, and mixed uniformly, and then the obtained mixture is aged in a cold bath at −85° C. for 60 min.

In a 2000 mL glass reactor equipped with a high-speed stirrer, 1100 g of a monochloromethane mixed solution cooled to −85° C. (wherein a K resin as a grafting agent is dissolved in methyl chloride, and the K resin is a product of Phillips, $M_w$ is 114,000, the content of butadiene in the K resin is 39.5 mol %, and the content of the structural unit formed by the 1,2-polymerization of butadiene in the K resin is 4.6 mol %, the same as below), 101 g of isobutylene cooled to −85° C., and 6 mL of isoprene precooled to −20° C. is sequentially added, and uniformly mixed, and the cold bath temperature is lowered to a range of −90° C. to −100° C. Then, 70 mL of an initiator solution is added to the reactor to initiate polymerization, and the temperature of the cold bath is controlled to be in a range of −90° C. to −100° C. during the reaction. After the reaction is carried out for 30 min, 10 mL of a methanol solution containing 0.5% by weight of NaOH is added to the reactor to terminate the polymerization. The obtained mixture is placed in a hot water bath to remove the solvent, and the antioxidant 1010 is added for stabilization, and the obtained product is washed with water, and dried in a vacuum oven at 60° C. to a constant weight, thus a butyl rubber according to the present invention is obtained. The experimental results are listed in Tables 14 to 16.

Comparison Example 3

A butyl rubber is prepared in the same manner as in Example 7-10, except that a grafting agent is not used.

TABLE 14

| | | | Butyl rubber | |
|---|---|---|---|---|
| No. | Amount of grafting agent/g | Conversion rate/% | Content of the structural unit derived from conjugated diene/mol % | Content of the structural unit derived from styrene/mol % |
| Comparison Example 3 | 0 | 46.7 | 1.57 | 0 |
| Example 7 | 0.1058 | 51.2 | 1.49 | 0.06 |
| Example 8 | 0.9467 | 60.4 | 1.47 | 0.58 |
| Example 9 | 1.9002 | 57.2 | 1.62 | 1.18 |
| Example 10 | 2.6284 | 51.9 | 1.72 | 2.76 |

TABLE 15

| No. | Log (MW)[1] | Content of polymer with Log (MW) ≥ 6/ wt % | $M_p$ | $M_Z$ | $M_z/M_w$ | $M_w/M_n$ |
|---|---|---|---|---|---|---|
| Comparison Example 3 | 5.93 | 14.8 | 799800 | 1336000 | 1.56 | 3.12 |
| Example 7 | 6.23 | 31.4 | 1223900 | 3523000 | 2.07 | 3.66 |
| Example 8 | 6.26 | 55.2 | 1429800 | 4675000 | 2.57 | 4.66 |
| Example 9 | 6.32 | 68.9 | 1779600 | 5899000 | 2.83 | 4.60 |
| Example 10 | 6.17 | 75.2 | 1852100 | 5602000 | 3.78 | 5.92 |

[1]Position of peak log (MW) values of high molecular weight shoulder

TABLE 16

| No. | Mooney viscosity ML (1 + 8) 125° C. | Area under the stress relaxation curve | Extrusion swell ratio at a shearing rate of 600 s$^{-1}$ |
|---|---|---|---|
| Comparison Example 3 | 51.8 | 410.78 | 1.49 |
| Example 7 | 44.3 | 389.41 | 1.31 |
| Example 8 | 50.2 | 535.28 | 1.29 |
| Example 9 | 60.0 | 620.68 | 1.27 |
| Example 10 | 47.2 | 496.70 | 1.32 |

Example 11

120 mL of dichloromethane solution containing HCl (a concentration of 0.0028 mol/L) precooled to −80° C. is added in a 200 mL horn-shaped bottle at a temperature of −80° C., and then, 8 mL of a n-hexane solution of ethylaluminum dichloride (EADC) at a concentration of 0.9 mol/L is sequentially added into the horn-shaped bottle, and mixed uniformly, and the obtained mixture is aged in a cold bath at −85° C. for 120 min.

In a 2000 mL glass reactor equipped with a high-speed stirrer, 1100 g of a solution of methyl chloride cooled to −85° C., 101 g of isobutylene cooled to −85° C., and 4.8 mL of isoprene precooled to −20° C. is sequentially added (the K resin as a grafting agent is dissolved in isoprene), and uniformly mixed, and the temperature of the cold bath is lowered to a range of from −90° C. to −100° C. Then, 72 mL of an initiator solution is added to the reactor to initiate polymerization, and the temperature of the cooling bath is controlled to be in a range of −90° C. to −100° C. during the reaction. After the reaction is carried out for 30 min, 10 mL of a methanol solution containing 0.5% by weight of NaOH is added to the reactor to terminate the polymerization. The obtained mixture is placed in a hot water bath to remove the solvent, and the antioxidant 1010 is added for stabilization, the obtained product is washed with water and dried in a vacuum oven at 60° C. to a constant weight, thus, a butyl rubber according to the present invention is obtained. The experimental results are listed in Tables 17 to 19.

Example 12

A butyl rubber is prepared in the same manner as in Example 11, except that the grafting agent is dissolved in monochloromethane. The experimental results are listed in Tables 17 to 19.

Example 13

A butyl rubber is prepared in the same manner as in Example 11, except that the grafting agent is a styrene-isoprene-styrene triblock copolymer, which is prepared by the following method.

A 250 mL polymerization flask is used, which is heat-baked and repeatedly replaced with nitrogen and subjected to vacuuming to be anhydrous and anaerobic, then, 40 mL of a cyclohexane solution containing 7.4 mL of styrene is added, and the polymerization flask is placed in a constant temperature water bath at 30° C., after the light component impurities are removed, an initiator n-butyllithium solution is added, timing and uniform shaking are performed, and after the reaction is carried out for 90 min, 0.6 mL of the impurity-removed isoprene is added and the reaction is carried out for 120 min. Then, 7.4 mL of the impurity-removed styrene is added, and after the reaction is carried out for 120 min, the reaction is terminated by adding 10 mL of anhydrous methanol. The glue solution in the polymerization flask is poured into a clean tray and dried in a vacuum oven at 35° C. for 24 hours to obtain the styrene-isoprene-styrene triblock copolymer.

The weight-average molecular weight of the prepared styrene-isoprene-styrene triblock copolymer is 45,300, a molecular weight distribution index is 1.45, the content of the structural unit derived from isoprene is 3.62 mol %, the content of the structural unit formed by isoprene in a 1,2-polymerization manner is 0 mol %, and the content of the structural unit formed by isoprene in a 3,4-polymerization manner is 2.67 mol %.

Example 14

A butyl rubber is prepared in the same manner as in Example 11, except that the grafting agent is a styrene-isoprene-styrene triblock copolymer, which is prepared by the following method.

A 250 mL polymerization flask is used, which is heat-baked and repeatedly replaced with nitrogen and subjected to vacuuming to be anhydrous and anaerobic, then 4.6 mL of styrene and 40 mL of a cyclohexane solution containing 1 mL of a polar regulator tetrahydrofuran are added, and the mixture is placed in a constant temperature water bath at 30° C., after the light component impurities are removed, an initiator n-butyllithium solution is added, timing and uniform shaking are performed, and after the reaction is carried out for 90 min, 1.5 mL of the impurity-removed isoprene is added and the reaction is carried out for 120 min. Then, 4.6 mL of the impurity-removed styrene is added, and after the reaction is carried out for 120 min, the reaction is terminated by adding 10 mL of anhydrous methanol. The solution glue in the polymerization flask is poured into a clean tray and dried in a vacuum oven at 35° C. for 24 hours to obtain the styrene-isoprene-styrene triblock copolymer.

The weight-average molecular weight of the prepared styrene-isoprene-styrene triblock copolymer is 25000, a molecular weight distribution index is 1.14, the content of the structural unit derived from isoprene is 16.98 mol %, the content of the structural unit formed by isoprene in a 1,2-polymerization manner is 0.80 mol %, and the content of the structural unit formed by isoprene in a 3,4-polymerization manner is 10.73 mol %.

Comparison Example 4

A butyl rubber is prepared in the same manner as in Example 11, except that a grafting agent is not used.

TABLE 17

| | | | Butyl rubber | |
|---|---|---|---|---|
| No. | Amount of grafting agent/g | Conversion rate/% | Content of structural unit derived from conjugated diene/mol % | Content of structural unit derived from styrene/mol % |
| Comparison Example 4 | 0 | 75.1 | 1.57 | 0 |
| Example 11 | 0.5042 | 76.7 | 1.35 | 0.17 |
| Example 12 | 0.5042 | 79.2 | 1.46 | 0.22 |
| Example 13 | 0.5179 | 85.7 | 1.81 | 0.37 |
| Example 14 | 0.1476 | 73.4 | 1.85 | 0.83 |

TABLE 18

| No. | Log (MW)[1] | Content of polymer with Log (MW) ≥ 6/ weight % | $M_p$ | $M_Z$ | $M_z/M_w$ | $M_w/M_n$ |
|---|---|---|---|---|---|---|
| Comparison Example 4 | 5.9 | 15.4 | 835400 | 1290000 | 1.61 | 3.03 |
| Example 11 | 6.23 | 54.9 | 1367100 | 4995000 | 2.97 | 4.66 |
| Example 12 | 6.27 | 57.1 | 1436600 | 5127000 | 2.78 | 4.60 |
| Example 13 | 6.27 | 45.3 | 1298700 | 4621000 | 2.46 | 3.39 |
| Example 14 | 6.24 | 49.1 | 1342600 | 4520000 | 2.58 | 3.55 |

[1]Position of peak log (MW) values of high molecular weight shoulder

TABLE 19

| No. | Mooney viscosity ML (1 + 8) 125° C. | Area under the stress relaxation curve | Extrusion swell ratio at a shearing rate of 700 s$^{-1}$ |
|---|---|---|---|
| Comparison Example 4 | 43.05 | 331.51 | 1.35 |
| Example 11 | 50.27 | 498.34 | 1.31 |
| Example 12 | 51.39 | 506.74 | 1.32 |
| Example 13 | 37.40 | 535.78 | 1.25 |
| Example 14 | 39.80 | 496.87 | 1.26 |

Examples 15-16

(1) At a temperature of −80° C., 120 mL of a dichloromethane solution containing HCl (a concentration of 0.009 mol/L) precooled to −80° C. and 6.7 mL of a n-hexane solution containing EADC (a concentration of 0.9 mol/L) is sequentially added in a 200 mL horn-shaped bottle, and mixed uniformly, and then the obtained mixture is aged in a cold bath at −80° C. for 60 min to obtain an initiator solution.

In a 2000 mL glass reactor equipped with a high-speed stirrer, 1100 g of methyl chloride cooled to −60° C. (wherein the K resin as a grafting agent is dissolved in methyl chloride, and the amount of the grafting agent is listed in Table 7), 132 g of isobutylene precooled to −60° C. and 6 mL of isoprene precooled to −20° C. are sequentially added, and mixed uniformly, and the cold bath temperature is lowered to a temperature in a range of −90° C. to −100° C. Then, 135 mL of an initiator solution is added to the reactor to initiate polymerization, and the temperature of the cold bath is controlled to be in a range of −90° C. to −100° C. during the reaction. After the reaction is carried out for 30 min, 10 mL of a methanol solution containing 0.5% by weight of NaOH is added to the reactor to terminate the polymerization. The obtained partial liquid mixture is placed in a hot water bath to remove the solvent, and the obtained product is washed with water, and dried at 60° C. to a constant weight in a vacuum oven to obtain a butyl rubber according to the present invention. The experimental results are listed in Tables 20 to 22.

(2) The remaining liquid mixture obtained in the step (1) is pressed into a vacuumized halogenation reactor with nitrogen, and then 3.8 g of liquid bromine is added to the halogenation reactor, and a reaction is carried out at a temperature of 40° C. for 5 minutes. Then, neutralization is carried out by adding 7 mL of an aqueous solution containing 2% by weight of NaOH for 5 minutes. The solvent of the neutralized mixture is removed by water vapor and coagulated, and the obtained aqueous brominated rubber is dried at 110° C. for 7 min on an open mill to obtain a bromobutyl rubber, and the bromine content of the bromobutyl rubber is measured and a relaxation test and an extrusion swell ratio test are carried out, and the results are listed in Table 23.

Comparison Example 5

A butyl rubber and a bromobutyl rubber are prepared in the same manner as in Example 15, except that a grafting agent is not used.

Comparison Example 6

A butyl rubber and a bromobutyl rubber are prepared in the same manner as in Example 15, except that the initiator solution is prepared by the following method: in an inert gas glove box, placing 390 mg of AlCl$_3$ powder in a 200 mL polymerization bottle, then 120 mL of a refined CH$_2$Cl$_2$ solution (the water content in the CH$_2$Cl$_2$ solution is 10 ppm) is added, and the materials are uniformly mixed until AlCl$_3$ is completely dissolved, and then aged in a cold bath at −80° C. for 60 minutes to obtain the initiator solution.

TABLE 20

| No. | Amount of grafting agent/g | Conversion rate/% | Butyl rubber Content of structural unit derived from conjugated diene/mol % | Content of structural unit derived from styrene/mol % |
| --- | --- | --- | --- | --- |
| Comparison Example 5 | 0 | 83.1 | 1.57 | 0 |
| Comparison Example 6 | 0.8127 | 80.8 | 1.45 | 0.48 |
| Example 15 | 0.8127 | 79.9 | 1.39 | 0.52 |
| Example 16 | 1.6340 | 80.5 | 1.40 | 1.45 |

TABLE 21

| No. | Log (MW)[1] | Content of polymer with Log (MW) ≥ 6/wt % | $M_p$ | $M_z$ | $M_z/M_w$ | $M_w/M_n$ |
| --- | --- | --- | --- | --- | --- | --- |
| Comparison Example 5 | 5.91 | 15.7 | 784600 | 1350000 | 1.68 | 2.98 |
| Comparison Example 6 | 6.10 | 28.4 | 898700 | 2984000 | 2.36 | 3.31 |
| Example 15 | 6.26 | 51.3 | 1404800 | 4729000 | 2.57 | 3.78 |
| Example 16 | 6.33 | 52.9 | 1475300 | 5629000 | 2.63 | 3.69 |

[1]Position of peak log (MW) values of high molecular weight shoulder

TABLE 22

| No. | Mooney viscosity ML (1 + 8) 125° C. | Area under the stress relaxation curve | Extrusion swell ratio at a shearing rate of 500 s$^{-1}$ |
| --- | --- | --- | --- |
| Comparison Example 5 | 51.7 | 437.76 | 1.44 |
| Comparison Example 6 | 49.8 | 419.42 | 1.45 |
| Example 15 | 51.5 | 477.54 | 1.32 |
| Example 16 | 52.7 | 534.62 | 1.33 |

TABLE 23

| No. | Bromine content/mol % | Mooney viscosity ML (1 + 8) 125° C. | Area under the stress relaxation curve | Extrusion swell ratio at a shearing rate of 800 s$^{-1}$/% |
| --- | --- | --- | --- | --- |
| Comparison Example 5 | 1.02 | 45.6 | 532.7 | 1.49 |
| Comparison Example 6 | 1.06 | 44.8 | 509.6 | 1.51 |
| Example 15 | 1.17 | 46.0 | 608.5 | 1.34 |
| Example 16 | 1.13 | 47.2 | 599.7 | 1.33 |

The results of Examples 15 to 16 confirm that the butyl rubber prepared by the method of the present invention and the halogenated butyl rubber prepared from the butyl rubber have a larger area under the stress relaxation curve in the case where the Mooney viscosity is similar, thus having better cold flow resistance, as a result, having a more effectively resisting deformation during transportation and storage; and the butyl rubber prepared by the method of the invention and the halogenated butyl rubber prepared from the butyl rubber have a lower extrusion swell effect (i.e., a low die swell rate), and the prepared product has better dimensional stability.

Figure 5:
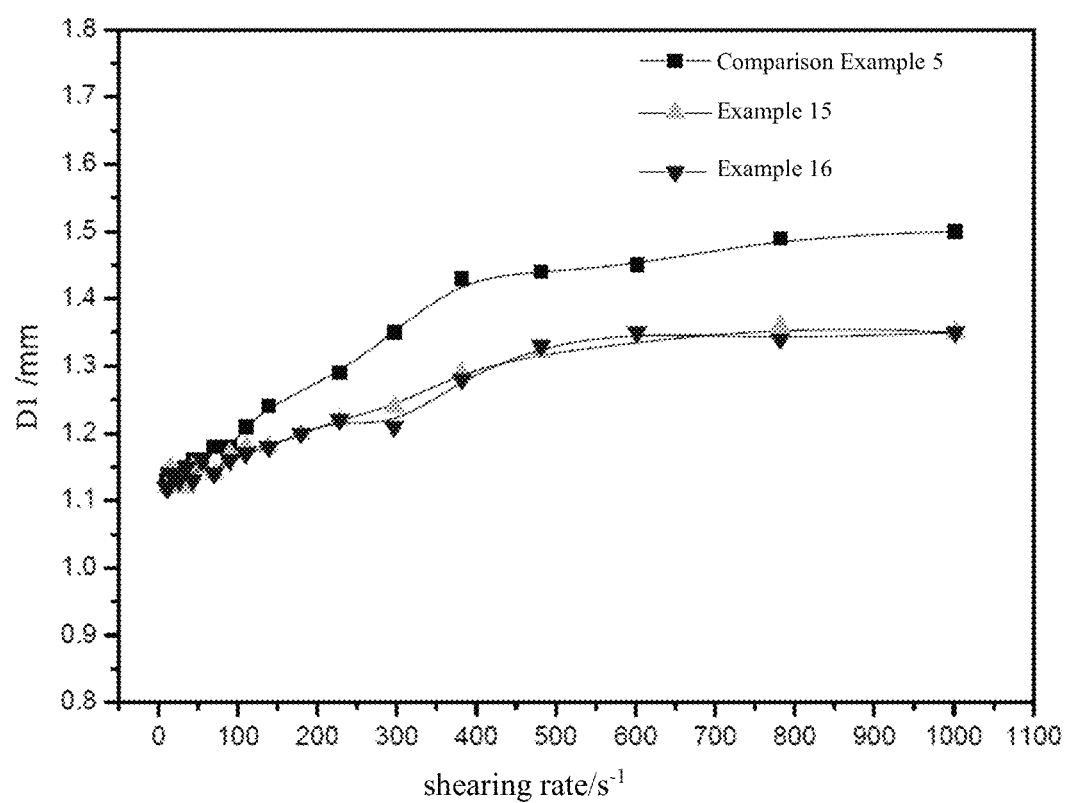
FIG. 5 is a graph showing the relationship between the extrusion swell ratio and the shearing rate at 100° C. of the butyl rubbers prepared in Examples 15 and 16 as well as Comparison Example 5.

FIG. 5 is a graph showing the relationship between the extrusion swell ratio and the shearing rate of the butyl rubbers prepared in Examples 15 and 16 and Comparison Example 5, wherein the test is performed at a temperature of 100° C. by using a L/D of 16/1 die at a shearing rate in a range of 10-1000 s$^{-1}$.

As can be seen from FIG. 5, the butyl rubber prepared by the method of the present invention exhibits a lower extrusion swell ratio under conditions that the Mooney viscosity is substantially the same (i.e., the butyl rubber according to the present invention has a lower die swell ratio), thus having a lower shrinkage, and the product has better dimensional stability.

Test Example 6

The butyl rubber and the halogenated butyl rubber prepared in Examples 15 to 16 and Comparison Examples 5 to 6 are respectively prepared into a mixed rubber for vulcanization (the vulcanization temperature is 150° C., and the vulcanization time is 30 min), and physical and mechanical properties are tested, and the experimental results of the mechanical properties of the vulcanized rubber are listed in Table 24, and the results of the airtightness test are listed in Table 25.

TABLE 24

| Items | Butyl rubber | | | | Bromobutyl rubber | | | |
|---|---|---|---|---|---|---|---|---|
| | Comparison Example 5 | Comparison Example 6 | Example 15 | Example 16 | Comparison example 5 | Comparison example 6 | Example 15 | Example 16 |
| Hardness (Shore A) | 64 | 64 | 65 | 66 | 49 | 48 | 50 | 50 |
| Tensile strength/ MPa | 16.53 | 16.38 | 17.22 | 16.97 | 12.2 | 12.2 | 14.2 | 14.1 |
| Tensile stress at a given elongation of 100%/MPa | 2.42 | 2.39 | 2.28 | 2.16 | 1.48 | 1.45 | 1.49 | 1.48 |
| Tensile stress at a given elongation of 300%/MPa | 9.17 | 9.17 | 8.55 | 8.28 | 6.19 | 6.07 | 5.71 | 5.84 |
| Elongation at break/% | 523 | 526 | 563 | 566 | 591 | 586 | 680 | 686 |
| Permanent deformation/% | 30 | 31 | 30 | 29 | 8 | 9 | 10 | 10 |
| Tear strength/ kN/m | 35 | 35 | 39 | 39 | 24 | 23 | 26 | 27 |

The results of Table 24 confirm that the butyl rubber and the halogenated rubber according to the present invention have good overall mechanical properties, particularly exhibiting higher elongation at break and higher tear strength, and are suitable as a automobile tire inner tube and a curing bladder.

The results of Table 25 confirm that the butyl rubber and the halogenated butyl rubber according to the present invention have good airtightness and are suitable as a automobile tire inner liner.

The preferred embodiments of the present invention are described in detail above, but the present invention is not limited to the specific details of the above embodiments, and various simple modifications can be made to the technical solutions of the present invention within the scope of the technical idea of the present invention. These simple modifications all fall within the scope of protection of the present invention. It should be further noted that the specific technical features described in the above specific embodiments may be combined in any suitable manner without contradiction. To avoid unnecessary repetition, the present invention has various possibilities. The combination method will not be described separately. In addition, any combination of various embodiments of the invention may be made as long as it does not deviate from the idea of the invention, and it should be regarded as the disclosure of the invention.

The invention claimed is:

1. A butyl rubber, comprising a structural unit derived from isobutylene, a structural unit derived from conjugated diene, and optionally a structural unit derived from aryl olefin, wherein, at least a part of the conjugated diene is isoprene, and the aryl olefin is a compound of Formula I,

TABLE 25

| Items | Butyl rubber | | | | Bromobutyl rubber | | | |
|---|---|---|---|---|---|---|---|---|
| | Comparison Example 5 | Comparison Example 6 | Example 15 | Example 16 | Comparison example 5 | Comparison example 6 | Example 15 | Example 16 |
| Gas permeability/ cm$^3$/m$^2$ · 24 h · 0.1 MPa | 21.742 | 21.896 | 21.048 | 21.601 | 31.256 | 31.798 | 29.989 | 30.374 |
| Transmission coefficient × 10$^{-11}$/ cm$^3$ · cm/cm$^2$ · s · cmHg | 3.319 | 3.341 | 3.294 | 3.204 | 5.424 | 5.541 | 5.201 | 5.346 |

 (Formula I)

in Formula I, $R_1$ is an aryl group of $C_6$-$C_{20}$;

wherein, in the butyl rubber, a part of the structural unit derived from conjugated diene serves as a grafting site so that a part of the molecular chain of the butyl rubber is a grafted chain, and a remaining part of the molecular chain of the butyl rubber is a linear chain; and wherein a peak molecular weight of the butyl rubber is 0.9 million to 2.6 million, and a content of the butyl rubber of which Log (MW) is greater than or equal to 6 is 30 to 80% by weight wherein MW is molecular weight.

2. The butyl rubber according to claim 1, wherein the main chain of the grafted chain comprises the structural unit derived from conjugated diene and the structural unit derived from aryl olefin, and a branch of the grafted chain comprises the structural unit derived from isobutylene and the structural unit derived from isoprene.

3. The butyl rubber according to claim 1, wherein the linear chain comprises the structural unit derived from isobutylene and the structural unit derived from isoprene.

4. The butyl rubber according to claim 1, wherein, based on a total amount of the butyl rubber, a content of the structural unit derived from conjugated diene is from 0.5 to 2.5 mol %, and a content of the structural unit derived from aryl olefin is from 0.01 to 3 mol %.

5. The butyl rubber according to claim 1, wherein a Mooney viscosity ML (1+8) 125° C. of the butyl rubber is 30 to 70.

6. The butyl rubber according to claim 1, wherein the content of the butyl rubber of which Log (MW) is greater than or equal to 6 is 35 to 75% by weight.

7. The butyl rubber according to claim 1, wherein the peak molecular weight of the butyl rubber is 0.95 million to 2.3 million. more preferably 1.1 million to 1.9 million.

8. The butyl rubber according to claim 1, wherein a molecular weight of the butyl rubber exhibits a bimodal distribution, and a Log (MW) value of a high molecular weight shoulder peak is between 6 and 7.5.

9. The butyl rubber according to claim 1, wherein the butyl rubber is prepared by a method comprising a step of contacting isobutylene and isoprene with at least one grafting agent in at least one diluent in the presence of at least one Lewis acid and at least one compound capable of providing protons under cationic polymerization conditions, wherein the at least one Lewis acid is a compound of Formula III, $AlR^5_n X^1_{(3-n)}$ (Formula III)

in Formula III, $R^5$ are the same or different and each represents an alkyl group of $C_1$-$C_8$; $X^1$ are the same or different and each represents a halogen; n is 1, 2 or 3; and the at least one compound capable of providing protons is protonic acid.

10. The butyl rubber according to claim 9, wherein, based on a total amount of isobutylene and isoprene, a content of the isobutylene is 85 to 99% by weight, and a content of isoprene is 1 to 15% by weight.

11. The butyl rubber according to claim 9, wherein an amount of the at least one grafting agent is 0.01 to 3% by weight of isobutylene.

12. The butyl rubber according to claim 9, wherein the at least one grafting agent comprises polymerizable structural unit with cationically polymerizable group and the optional aryl olefin structural unit derived from the compound of Formula I.

13. The butyl rubber according to claim 12, wherein, in the at least one grafting agent, a content of the polymerizable structural unit is 1 to 15 mol %; and/or a weight-average molecular weight of the at least one grafting agent is 10,000 to 300,000; and a molecular weight distribution index is 1 to 2.5.

14. The butyl rubber according to claim 9, wherein a molar ratio of the at least one Lewis acid to isobutylene is 1:500 to 1:5,000; and/or a molar ratio of the at least one compound capable of providing protons to the at least one Lewis acid is from 0.01:1 to 1:1; and/or the at least one diluent is selected from alkanes and halogenated alkanes.

15. The butyl rubber according to claim 9, wherein the contacting step is carried out at a temperature ranging from −120° C. to −50° C.

16. A halogenated butyl rubber, comprising a rubber matrix and a halogen element bonded to the rubber matrix, wherein the rubber matrix is the butyl rubber of claim 1.

17. The halogenated butyl rubber according to claim 16, wherein the halogen element is a chlorine element and/or a bromine element.

18. The halogenated butyl rubber according to claim 16, wherein, based on a total amount of the halogenated butyl rubber, a content of the halogen element is in a range of 0.2 to 2 mol %.

19. A composition, comprising the butyl rubber according to claim 1, a vulcanizing agent, and optionally at least one additive agent, wherein the at least one additive agent is a vulcanization accelerator or carbon black.

20. An automobile tire inner liner, formed by the halogenated butyl rubber according to claim 16.

21. An automobile tire inner tube, formed by the butyl rubber according to claim 1.

22. A curing bladder, formed by the butyl rubber according to claim 1.

23. A composition, comprising the halogenated butyl rubber according to claim 16, a vulcanizing agent, and optionally at least one additive agent, wherein the at least one additive agent is a vulcanization accelerator or carbon black.

* * * * *